US010941707B1

(12) United States Patent
Berkey et al.

(10) Patent No.: US 10,941,707 B1
(45) Date of Patent: Mar. 9, 2021

(54) HYBRID TURBINE ENGINES, AIRCRAFT INCLUDING THE SAME, AND ASSOCIATED METHODS

(71) Applicant: The Boeing Company, Chicago, IL (US)

(72) Inventors: Tyler Emerson Berkey, Charleston, SC (US); Daniel S. Thomas, Summerville, SC (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/657,860

(22) Filed: Oct. 18, 2019

(51) Int. Cl.
| | | |
|---|---|---|
| *F01D 15/10* | (2006.01) |
| *F02C 6/20* | (2006.01) |
| *B64D 27/02* | (2006.01) |
| *B64D 27/14* | (2006.01) |
| *H02K 7/108* | (2006.01) |
| *H02K 7/18* | (2006.01) |
| *B64D 27/24* | (2006.01) |

(52) U.S. Cl.
CPC .............. *F02C 6/20* (2013.01); *B64D 27/02* (2013.01); *B64D 27/14* (2013.01); *B64D 27/24* (2013.01); *H02K 7/108* (2013.01); *H02K 7/1823* (2013.01); *B64D 2027/026* (2013.01); *F05D 2220/323* (2013.01)

(58) Field of Classification Search
CPC .......... F01D 15/10; F02C 6/20; B64D 27/02; B64D 27/14; B64D 27/24; H02K 7/108; H02K 7/1823
See application file for complete search history.

(56) References Cited

U.S. PATENT DOCUMENTS

| | | | |
|---|---|---|---|
| 3,705,775 A | 12/1972 | Rioux |
| 3,940,926 A | 3/1976 | Craig |
| 4,424,452 A | 1/1984 | Francis |
| 6,467,725 B1 | 10/2002 | Coles et al. |
| 8,099,944 B2 | 1/2012 | Foster et al. |

(Continued)

OTHER PUBLICATIONS

Farid Yousefi, Hybrid Turbo Fan Engine (Apr. 2012), Tech Briefs Create the Future Design Contest 2017, downloaded from TechBriefs. com on Dec. 13, 2017.

(Continued)

*Primary Examiner* — Shafiq Mian
(74) *Attorney, Agent, or Firm* — Dascenzo Gates Intellectual Property Law, P.C.

(57) ABSTRACT

Hybrid turbine engines, aircraft including the same, and associated methods. A hybrid turbine engine includes a gas turbine engine mechanically and/or electrically coupled to a rotary electric engine. The rotary electric engine includes a nacelle, a fan with fan blades, a stator operatively coupled to the nacelle, and a rotor with a plurality of rotor magnets coupled to the fan blades. The stator includes a plurality of field coils. In examples, the stator is configured to rotate each field coil relative to the nacelle. In examples, an aircraft includes a hybrid turbine engine such that the gas turbine engine is substantially enclosed within the nacelle or is supported by a fuselage of the aircraft. In examples, a method of operating an aircraft with a hybrid turbine engine includes generating a gas turbine thrust with the gas turbine engine and generating an electric engine thrust with the rotary electric engine.

20 Claims, 12 Drawing Sheets

(56) References Cited

U.S. PATENT DOCUMENTS

| | | |
|---|---|---|
| 9,387,934 B2 | 7/2016 | Gomez |
| 9,447,734 B2 | 9/2016 | Mariotto et al. |
| 10,378,452 B1 | 8/2019 | Barmichev et al. |
| 2010/0013223 A1 | 1/2010 | Certain |
| 2010/0270802 A1 | 10/2010 | Presz, Jr. et al. |
| 2010/0295317 A1 | 11/2010 | Mahawili |
| 2012/0068670 A1 | 3/2012 | Bersiek |
| 2012/0128493 A1 | 5/2012 | Shelley |
| 2013/0000317 A1 | 1/2013 | Berryann et al. |
| 2014/0093399 A1 | 4/2014 | Pratelli et al. |
| 2015/0144742 A1 | 5/2015 | Moxon |
| 2015/0377142 A1 | 12/2015 | Sheridan et al. |
| 2017/0275009 A1 | 9/2017 | Huang |
| 2018/0003071 A1 | 1/2018 | Lents et al. |
| 2018/0079516 A1 | 3/2018 | Phan et al. |
| 2018/0163558 A1 | 6/2018 | Vondrell et al. |
| 2018/0354632 A1 | 12/2018 | Hon et al. |
| 2019/0002116 A1 | 1/2019 | Gansler et al. |
| 2020/0224547 A1* | 7/2020 | Chong .................. F02C 7/268 |

OTHER PUBLICATIONS

Hybrid Clutch Assembly for an Aircraft, Embry-Riddle Aeronautical University, Resolute Innovation, Oct. 1, 2014.

* cited by examiner

HYBRID TURBINE ENGINES, AIRCRAFT INCLUDING THE SAME, AND ASSOCIATED METHODS

FIELD

The present disclosure relates to hybrid turbine engines, aircraft including the same, and associated methods.

BACKGROUND

Fan-based engines, such as for providing thrust to an aircraft, typically utilize a liquid fuel (such as jet fuel) to rotate the fan. As an example, a turbofan engine utilizes a fan in combination with a gas turbine engine that consumes jet fuel to rotate the fan. However, utilizing a fan in combination with a gas turbine engine and/or a liquid fuel may introduce additional weight to the aircraft and may generate an exhaust during use thereof. Additionally, electrically powered aircraft and/or unmanned aerial vehicles typically utilize fans that are in a fixed orientation relative to the aircraft, thus introducing a trade-off between limited range (in the case of fans oriented for vertical lift) and large required areas for take-off and landing (in the case of fans oriented for forward travel).

SUMMARY

Hybrid turbine engines, aircraft including the same, and associated methods are disclosed herein. A hybrid turbine engine includes a gas turbine engine that includes a turbine and a rotary electric engine that is mechanically and/or electrically coupled to the gas turbine engine. The rotary electric engine includes a fan configured to rotate about an electric engine central axis to generate a thrust and a nacelle that at least substantially encompasses the fan. The rotary electric engine further includes a stator operatively coupled to the nacelle and a rotor operatively coupled to the fan. The fan includes a central hub and a plurality of fan blades extending from the central hub. Each fan blade includes a blade root that is operatively coupled to the central hub and a blade tip opposite the blade root, and the rotor includes a plurality of rotor magnets, each operatively coupled to a respective blade tip. The stator includes a plurality of field coils and is configured such that, during operative use of the rotary electric engine, magnetic interaction between the plurality of field coils and the plurality of rotor magnets operates to rotate the fan to generate the thrust. In some examples, the stator is configured to selectively and dynamically rotate each field coil relative to the nacelle. In some examples, the hybrid turbine engine further includes a clutch that is configured to selectively rotationally couple a turbine rotary shaft of the gas turbine engine and an electric engine rotary shaft that is operatively coupled to the fan.

In some examples, an aircraft includes a hybrid turbine engine such that the nacelle at least substantially encloses the gas turbine engine. In some examples, an aircraft includes a hybrid turbine engine such that the rotary electric engine is spaced apart from the gas turbine engine.

In some examples, a method of operating an aircraft that includes a hybrid turbine engine includes generating a gas turbine thrust with the gas turbine engine and generating an electric engine thrust with the rotary electric engine.

DESCRIPTION

Figure 1:
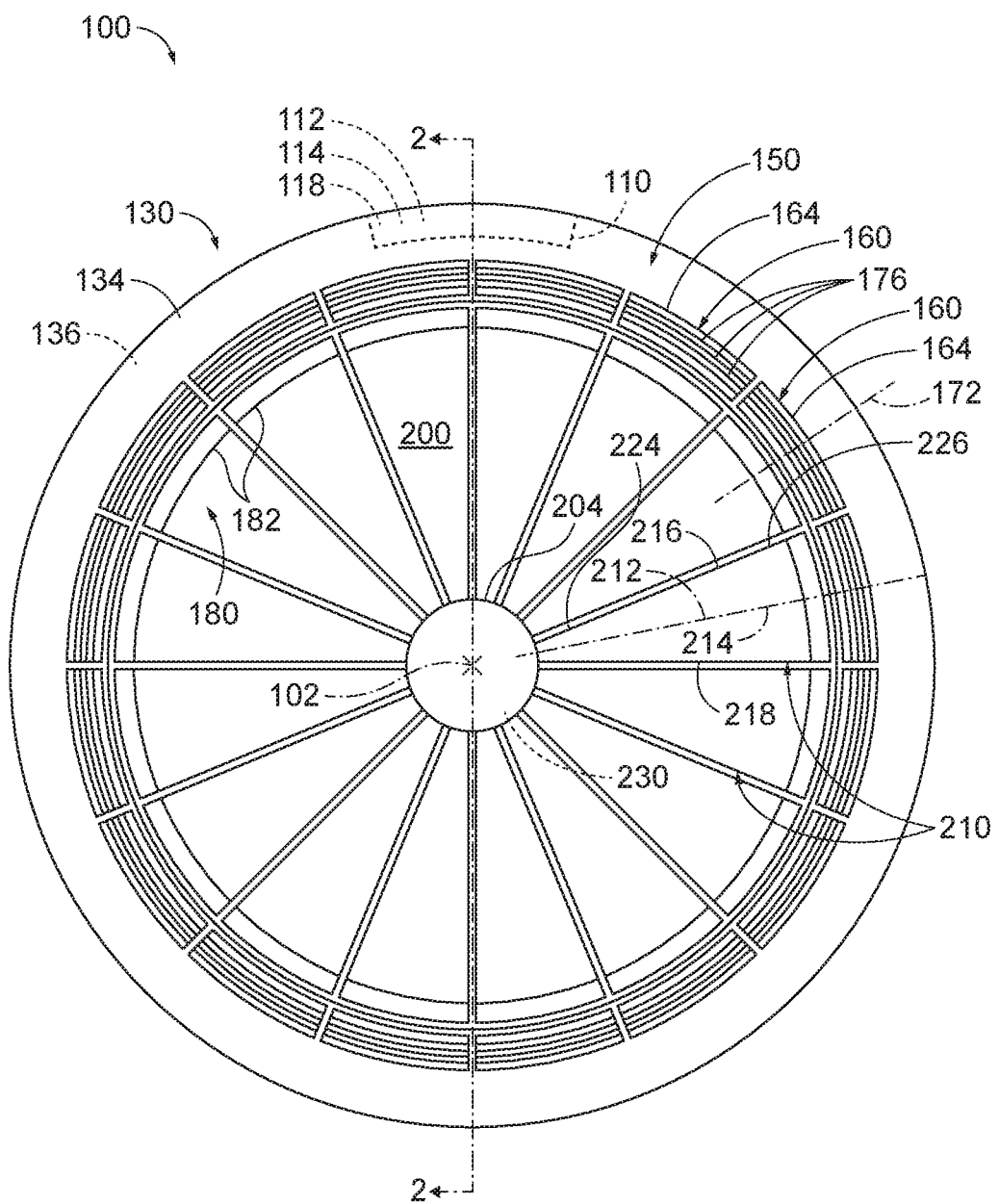
FIG. 1 is a schematic front elevation view representing examples of rotary electric engines according to the present disclosure.

FIGS. 1-18 provide illustrative, non-exclusive examples of rotary electric engines 100, of hybrid turbine engines 300, of aircraft 10 including rotary electric engines 100 and/or hybrid turbine engines 300, of methods 400 of operating an aircraft 10 that includes one or more rotary electric engines, and/or of methods 500 of operating an aircraft 10 that includes one or more hybrid turbine engines 300, according to the present disclosure. Elements that serve a similar, or at least substantially similar, purpose are labeled with like numbers in each of FIGS. 1-18, and these elements may not be discussed in detail herein with reference to each of FIGS. 1-18. Similarly, all elements may not be labeled in each of FIGS. 1-18, but reference numerals associated therewith may be utilized herein for consistency. Elements, components, and/or features that are discussed herein with reference to one or more of FIGS. 1-18 may be included in and/or utilized with any of FIGS. 1-18 without departing from the scope of the present disclosure. Generally, in the figures, elements that are likely to be included in a given example are illustrated in solid lines, while elements that are optional to a given example are illustrated in dashed lines. However, elements that are illustrated in solid lines are not essential to all examples of the present disclosure, and an element shown in solid lines may be omitted from a given example without departing from the scope of the present disclosure.

The present disclosure generally is directed to rotary electric engines 100 that are configured to produce a thrust, such as to propel an aircraft 10, as well as to aircraft 10 that utilize and/or include such rotary electric engines 100, hybrid turbine engines 300 that utilize and/or include such rotary electric engines 100, and aircraft 10 that utilize such hybrid turbine engines 300. As described in more detail herein, rotary electric engine 100 generally is configured to operate as an electric motor with a stator 150 that includes a plurality of field coils 160 and a rotor 180 operatively coupled to a fan 200 to electrically drive the fan. In this manner, and as described herein, rotary electric engines 100 may be at least substantially self-contained and thus suitable for a variety of uses and applications.

Figure 2:
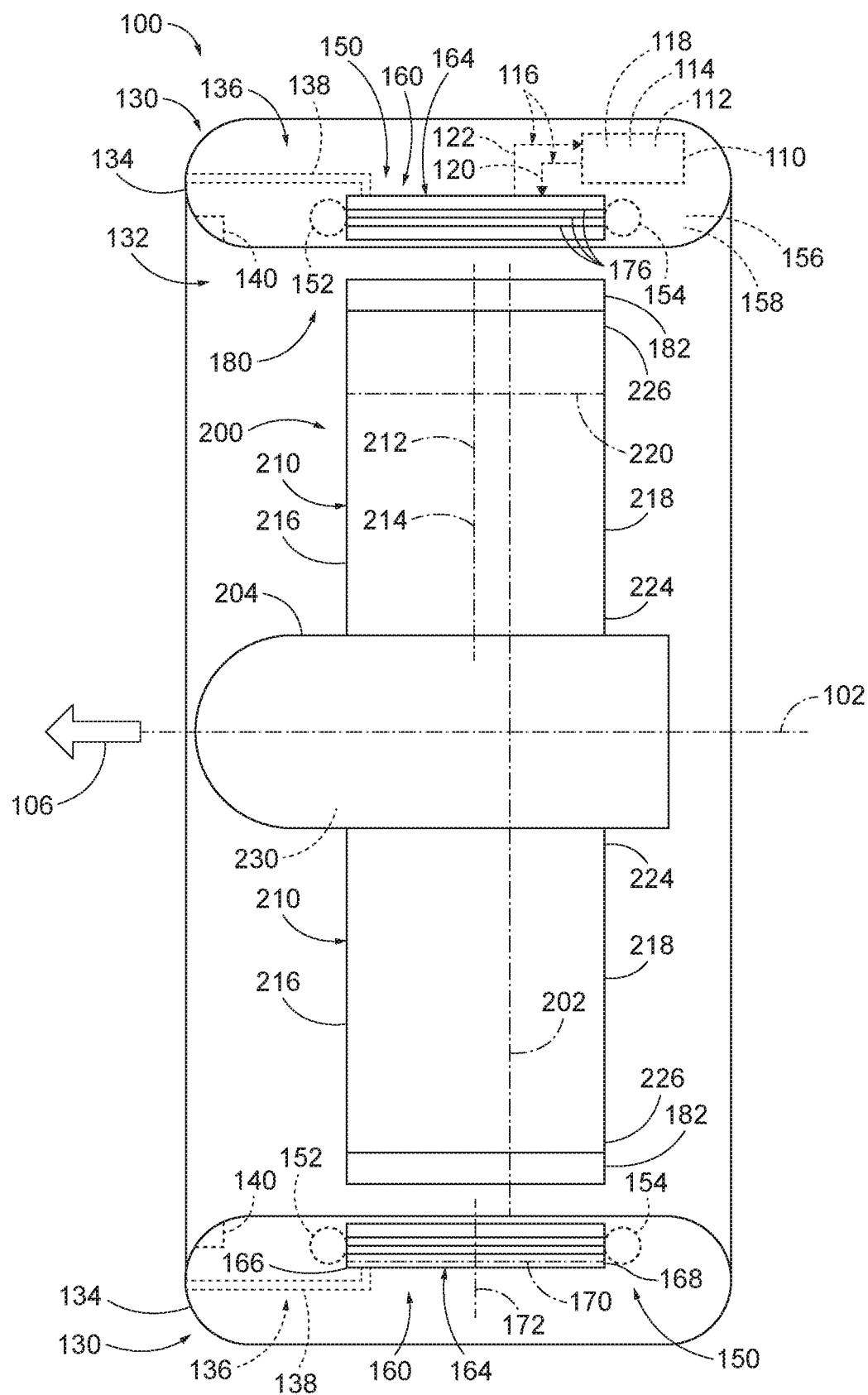
FIG. 2 is a schematic cross-sectional side elevation view taken along the line 2-2 in FIG. 1 and representing examples of rotary electric engines according to the present disclosure.
Figure 3:
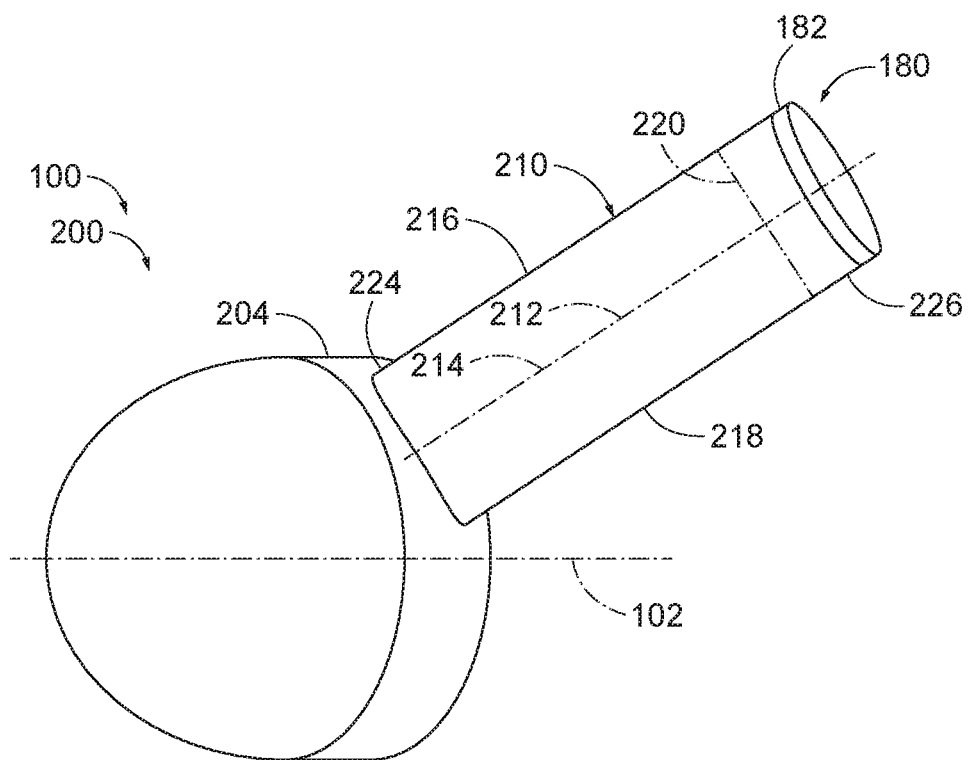
FIG. 3 is a schematic front side isometric elevation view representing an example of a portion of a rotary electric engine according to the present disclosure.
Figure 4:
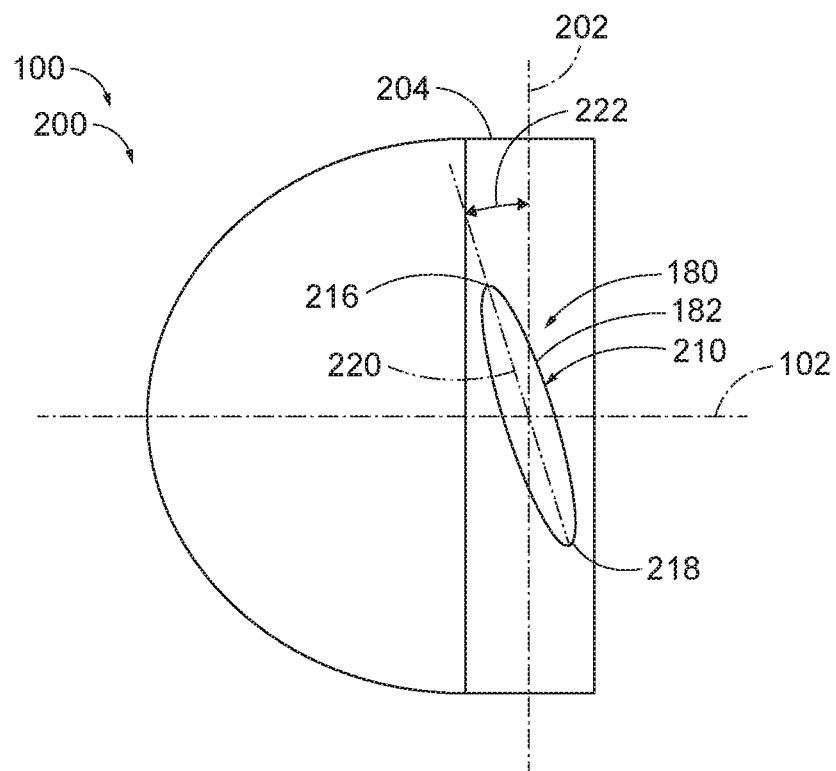
FIG. 4 is a schematic side elevation view representing the portion of the rotary electric engine of FIG. 3.

FIGS. 1-2 schematically illustrate examples of rotary electric engines 100, while FIGS. 3-4 are slightly less schematic representations of a portion of rotary electric engine 100. More specifically, FIG. 1 is a schematic front elevation view representing examples of rotary electric engines 100, while FIG. 2 is a schematic cross-sectional elevation view taken along the line 2-2 in FIG. 1. As schematically illustrated in FIGS. 1-2, a rotary electric engine 100 includes a fan 200 that is configured to rotate about an electric engine central axis 102 of rotary electric engine 100 to generate a thrust along an electric engine thrust direction 106 (as shown in FIG. 2). Fan 200 includes a central hub 204 and a plurality of fan blades 210 extending from central hub 204. Each fan blade 210 includes a blade root 224 that is operatively coupled to central hub 204 and a blade tip 226 opposite blade root 224. Rotary electric engine 100 additionally includes a nacelle 130 that at least substantially surrounds and/or encompasses fan 200. As schematically illustrated in FIGS. 1-2, nacelle 130 may include a lip skin 134 that at least partially defines an air intake 132 of rotary electric engine 100.

As used herein, the term "thrust," as used to describe a force acting upon an object, is to be understood as referring to a force with a direction corresponding to the direction in which the thrust urges the object. Thus, for example, a reference to fan 200 generating a thrust along electric engine thrust direction 106 generally refers to an example in which fan 200 generates an airflow in a direction opposite to electric engine thrust direction 106 such that rotary electric engine 100 receives a force (i.e., is urged) along electric engine thrust direction 106.

As further schematically illustrated in FIGS. 1-2, rotary electric engine 100 additionally includes a stator 150 operatively coupled to nacelle 130 and a rotor 180 operatively coupled to fan 200. Rotor 180 includes a plurality of rotor magnets 182, each of which is operatively coupled to a respective blade tip 226 of a respective fan blade 210, and stator 150 includes a plurality of field coils 160 configured to generate a magnetic field. In this manner, stator 150 is configured such that, during operative use of rotary electric engine 100, magnetic interaction between the plurality of field coils 160 and the plurality of rotor magnets 182 operates to rotate fan 200 about electric engine central axis 102 and to generate the thrust. Accordingly, rotary electric engine 100 generally operates via application of a force (viz. a magnetic force) to blade tip 226 of each fan blade 210 to rotate fan 200. In this manner, fan 200 also may be referred to and/or described as a rim-driven fan 200. This configuration thus imparts a greater torque upon fan 200 relative to a configuration in which a force of the same magnitude is applied to blade root 224 of each fan blade 210 (such as via rotation of central hub 204), such as may facilitate operating rotary electric engine 100 in conditions of relatively high aerodynamic load and without stalling.

As best schematically illustrated in FIG. 2, the plurality of field coils 160 may be at least substantially contained within nacelle 130. FIGS. 1-2 schematically illustrate the plurality of rotor magnets 182 as being spaced apart from the plurality of field coils 160 for clarity. However, it is additionally within the scope of the present disclosure that a gap between each rotor magnet 182 and a proximate field coil 160 be minimized and/or at least substantially nonexistent, such as to optimize a magnetic force between the plurality of rotor magnets 182 and the plurality of field coils 160.

Each rotor magnet 182 may include and/or be any appropriate material for generating and/or receiving a magnetic force, examples of which include a permanent magnet, an electromagnet, a ferromagnetic material, and/or a rare earth magnet. Additionally, each rotor magnet 182 may be operatively coupled to the corresponding fan blade 210 in any appropriate manner, such as via bonding and/or via a mechanical fastener. In some examples, each rotor magnet 182 may be integrally formed with the corresponding fan blade 210. In some examples, each rotor magnet 182 may operate to at least partially magnetize the corresponding fan blade 210.

Each field coil 160 may have any appropriate form and/or structure for generating a magnetic field for driving rotor 180. For example, and as schematically illustrated in FIGS. 1-2, each field coil 160 may include a coil core 164 and a coil wire 176 wrapped around coil core 164. In such examples, each field coil 160 may be configured such that passing an electric current through coil wire 176 operates to magnetize coil core 164 and to generate a magnetic field proximate field coil 160. In this manner, field coil 160 may be configured to operate as an electromagnet. Coil core 164 may include and/or be any appropriate material for being selectively magnetized in this manner, examples of which include a ferromagnetic material, a ferrite, a ferromagnetic ceramic compound, and/or iron.

The plurality of field coils 160 may be configured to interact with the plurality of rotor magnets 182 in any appropriate manner to rotate fan 200. As examples, during operative use of rotary electric engine 100, each field coil 160 may be configured to exert an attractive magnetic force and/or a repulsive magnetic force upon each rotor magnet 182 to rotate fan 200. In some examples, and as schematically illustrated in FIG. 1, the number of field coils 160 is equal to the number of rotor magnets 182. However, this is not required of all examples of rotary electric engine 100, and it is additionally within the scope of the present disclosure that the number of field coils 160 may be smaller than the number of rotor magnets 182 or larger than the number of rotor magnets 182.

As discussed, rotary electric engine 100 generally operates to rotate fan 200 by providing an electric current to the plurality of field coils 160 and/or the respective coil wires 176. More specifically, rotary electric engine 100 generally operates to rotate fan 200 by providing an electric current to the plurality of field coils 160 and/or to the respective coil wires 176 in a manner that is timed, synchronized, and/or otherwise configured to produce a magnetic field with each field coil 160 to rotate fan 200 at a selected fan rotational velocity and/or in a desired direction. To provide the electric current, and as further schematically illustrated in FIG. 1-2, rotary electric engine 100 additionally may include an electric power system 110 that is configured to provide an electric power input 120 (shown in FIG. 2) to stator 150 and/or to each field coil 160. In this manner, electric power input 120 may be configured to and/or may operate to rotate rotor 180 relative to stator 150 at the selected fan rotational velocity. As a more specific example, electric power input 120 may include an electric current that is supplied to the respective coil wire 176 of each field coil 160, and electric power input 120 may be configured to coordinate the electric current that is supplied to each respective coil wire 176 to rotate fan 200 at the selected fan rotational velocity. Stated differently, electric power system 110 may be configured to selectively provide each field coil 160 with a respective electric power input 120 such that the plurality of field coils 160 are magnetized at least partially sequentially and/or at least partially concurrently.

In some examples, and as further schematically illustrated in FIGS. 1-2, electric power system 110 further includes an energy storage device 112 that is configured to provide electric power input 120 to stator 150 and to receive and store an electric power output 122 that is generated by an electric generator 114. In some examples, rotary electric engine 100 includes electric generator 114. For example, electric generator 114 may include stator 150 and rotor 180 (e.g., in combination with one another), such that manually and/or mechanically rotating rotor 180 relative to stator 150 operates to generate electric power output 122 as the plurality of rotor magnets 182 induce electric currents in the plurality of field coils 160. Stated differently, stator 150 and rotor 180 collectively may be configured to selectively operate as an electric motor when electric power input 120 is supplied to stator 150 or to selectively operate as electric generator 114 when an external torque is applied to rotor 180. In other examples, electric generator 114 may be a component that is distinct from and/or spaced apart from rotary electric engine 100. For example, electric generator 114 may be spaced apart from nacelle 130 and/or exterior to nacelle 130. Electric power system 110 may be configured to provide electric power input 120 to stator 150 and/or to receive electric power output 122 from electric generator 114 in any appropriate manner. For example, and as schematically illustrated in FIG. 2, electric power system 110 additionally may include at least one power supply conduit 116 that is configured to convey electric power input 120 from energy storage device 112 to stator 150 and/or to receive electric power output 122 from electric generator 114.

In some examples, and as further schematically illustrated in FIGS. 1-2, electric power system 110 further includes a power conditioner 118, which also may be referred to herein as an electric power converter 118. Power conditioner 118, when present, may be configured to receive an unconditioned electric power input 120 from energy storage device 112, to condition unconditioned electric power input 120 to produce and/or generate a conditioned electric power input 120, and/or to provide conditioned electric power input 120 to stator 150. Additionally or alternatively, power conditioner 118 may be configured to receive an unconditioned electric power output 122 from electric generator 114, to condition unconditioned electric power output 122 to produce and/or generate a conditioned electric power output 122, and/or to provide conditioned electric power output 122 to energy storage device 112. An example of unconditioned electric power input 120 includes a direct current (DC) unconditioned electric power input 120. Examples of conditioned electric power input 120 include an alternating current (AC) conditioned electric power input 120, a single phase AC conditioned electric power input 120, and/or a three phase AC conditioned electric power input 120. Examples of unconditioned electric power output 122 include an AC unconditioned electric power output 122, a single phase AC unconditioned electric power output 122, and/or a three phase AC unconditioned electric power output 122. An example of conditioned electric power output 122 includes a DC conditioned electric power output 122. Power conditioner 118 may include and/or be any appropriate device, examples of which include an electric speed controller, an AC/DC converter, and a DC/AC inverter.

Figure 5:
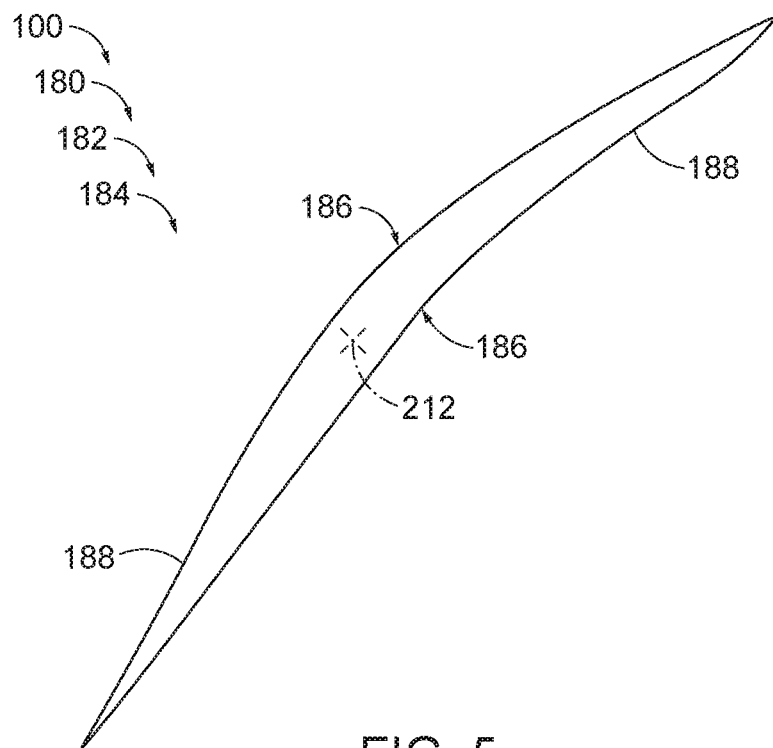
FIG. 5 is a top plan view representing an example of a magnet shape of a rotor magnet according to the present disclosure.

Each rotor magnet 182 may be sized and/or shaped to correspond to the respective fan blade 210 to which rotor magnet 182 is operatively coupled. In some examples, each rotor magnet 182 is sized and/or shaped to match a size and/or a shape of blade tip 226 of the corresponding fan blade 210 such that fan blade 210 and the corresponding rotor magnet 182 are at least substantially smoothly continuous with one another. Such a configuration is shown in FIGS. 3-4, which illustrate a single fan blade 210 of the plurality of fan blades 210 in isolation extending from central hub 204 and with the corresponding rotor magnet 182 operatively coupled to blade tip 226 thereof. That is, while FIGS. 3-4 illustrate a single fan blade 210 for clarity, it is to be understood that FIGS. 3-4 are representative of a portion of fan 200 that includes a plurality of fan blades 210. FIG. 5 illustrates a more specific example of a shape of rotor magnet 182, such as may correspond to and/or a match a shape of blade tip 226 of the corresponding fan blade 210. Specifically, as schematically illustrated in FIGS. 1-2 and less schematically illustrated in FIGS. 3 and 5, each fan blade 210 (shown in FIGS. 1-3) may have and/or be characterized by a blade longitudinal axis 212 that extends from blade root 224 to blade tip 226 (shown in FIGS. 1-3), and each rotor magnet 182 may have a magnet shape 184 (shown in FIG. 5), as viewed along blade longitudinal axis 212 of the corresponding fan blade 210, that has at least one magnet shape edge 186 that is at least partially curved. Magnet shape 184 may have any appropriate form and/or dimensions, such as may be determined by and/or correspond to a shape of the corresponding blade tip 226. For example, and as shown in FIG. 5, at least one magnet shape edge 186 of magnet shape 184 additionally may include a concave segment and a convex segment that are separated by a magnet shape point of inflection 188.

Figure 6:
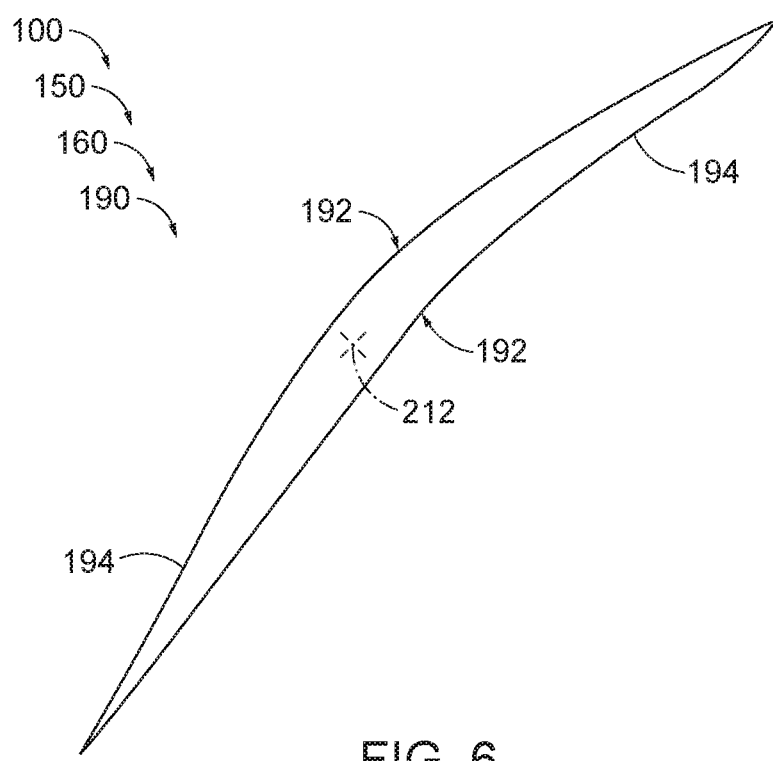
FIG. 6 is a top plan view representing an example of a coil shape of a field coil according to the present disclosure.

As discussed, rotary electric engine 100 generally operates to rotate fan 200 via magnetic interaction between the plurality of field coils 160 and the plurality of rotor magnets 182. Accordingly, each field coil 160 and/or each rotor magnet 182 may be configured to optimize a magnetic coupling therebetween. For example, and as illustrated in FIG. 6, each field coil 160 may be configured such that field coil 160 and/or the respective coil core 164 has a coil shape 190, as viewed along blade longitudinal axis 212 when field coil 160 and/or the respective coil core 164 is aligned with the corresponding fan blade 210 (e.g., as schematically illustrated in FIG. 1), that at least substantially matches and/or corresponds to magnet shape 184 of each rotor magnet 182. As examples, and as illustrated in FIG. 6, coil shape 190 may have at least one coil shape edge 192 that is at least partially curved and/or that has a concave segment and a convex segment that are separated by a coil shape point of inflection 194. Configuring each coil shape 190 and each magnet shape 184 to be at least substantially similar in form and/or dimension may operate to optimize a magnetic coupling between the corresponding coil core 164 and rotor magnet 182, thereby optimizing an efficiency with which rotor 180 and/or fan 200 may be rotated to provide the thrust.

In some examples, the plurality of fan blades 210 may be configured to rotate and/or pivot relative to central hub 204 during operative use of rotary electric engine 100. For example, and with reference to FIGS. 3-4, each fan blade 210 may be configured to rotate relative to central hub 204 about a respective blade pitch axis 214 of the fan blade 210. In some examples, and as schematically illustrated in FIGS. 1-2 and less schematically illustrated in FIG. 3, each blade pitch axis 214 may be at least substantially parallel to and/or at least substantially collinear with the corresponding blade longitudinal axis 212. FIGS. 3-4 additionally illustrate a manner in which each fan blade 210 may be rotated, angled, and/or pitched relative to a remainder of rotary electric engine 100. For example, and as shown in FIGS. 3-4, the plurality of fan blades 210 may extend at least substantially within a fan plane 202 (shown in FIG. 4 and schematically illustrated in FIG. 2), and each fan blade 210 may include a blade leading edge 216, a blade trailing edge 218 opposite blade leading edge 216, a blade chord line 220 that extends between blade leading edge 216 and blade trailing edge 218 in a direction perpendicular to blade longitudinal axis 212. In this manner, fan blade 210 may be characterized by a blade pitch angle 222 (shown in FIG. 4) that is measured between blade chord line 220 and fan plane 202, and each fan blade 210 may be configured to rotate about the respective blade pitch axis 214 to adjust the respective blade pitch angle 222. Each blade chord line 220 may extend through any appropriate portion of the respective fan blade 210 for measuring the respective blade pitch angle 222. For example, blade chord line 220 may extend through a portion of the respective fan blade 210 that is proximate the respective blade tip 226, or may extend through a portion of the respective fan blade 210 that is proximate the respective blade root 224. In some examples, fan 200 is configured such that the respective blade pitch angles 222 of the plurality of fan blades 210 are maintained and/or constrained to be at least substantially equal to one another.

The rotation of each fan blade 210 about the respective blade pitch axis 214 may be performed selectively, actively, and/or dynamically, such as to optimize a pitch of each fan blade 210 to exhibit a selected flight characteristic. In such examples, and as schematically illustrated in FIG. 2, rotary electric engine 100 may include a fan blade pitch controller 230 configured to actively and dynamically rotate each fan blade 210 about the respective blade pitch axis 214 to control the respective blade pitch angle 222. Additionally or alternatively, the rotation of each fan blade 210 about the respective blade pitch axis 214 may be performed at least partially passively. For example, the plurality of fan blades 210 may be configured to passively and/or automatically "unwind" as the fan rotational velocity of fan 200 increases, such as due to a torque imparted upon each fan blade 210 as the fan rotational velocity increases.

As discussed, it may be desirable to configure each field coil 160 and/or coil core 164 thereof to have a shape and/or configuration that matches that of each rotor magnet 182, such as to ensure that the rotor magnet shape and the coil core shape are at least substantially aligned, matching, and/or overlapping when the respective fan blade 210 is aligned with field coil 160. Accordingly, in an example in which each fan blade 210 is configured to rotate about the respective blade pitch axis 214, it additionally may be desirable that each field coil 160 also be configured to rotate relative to nacelle 130 to at least substantially maintain this alignment.

Figure 7:
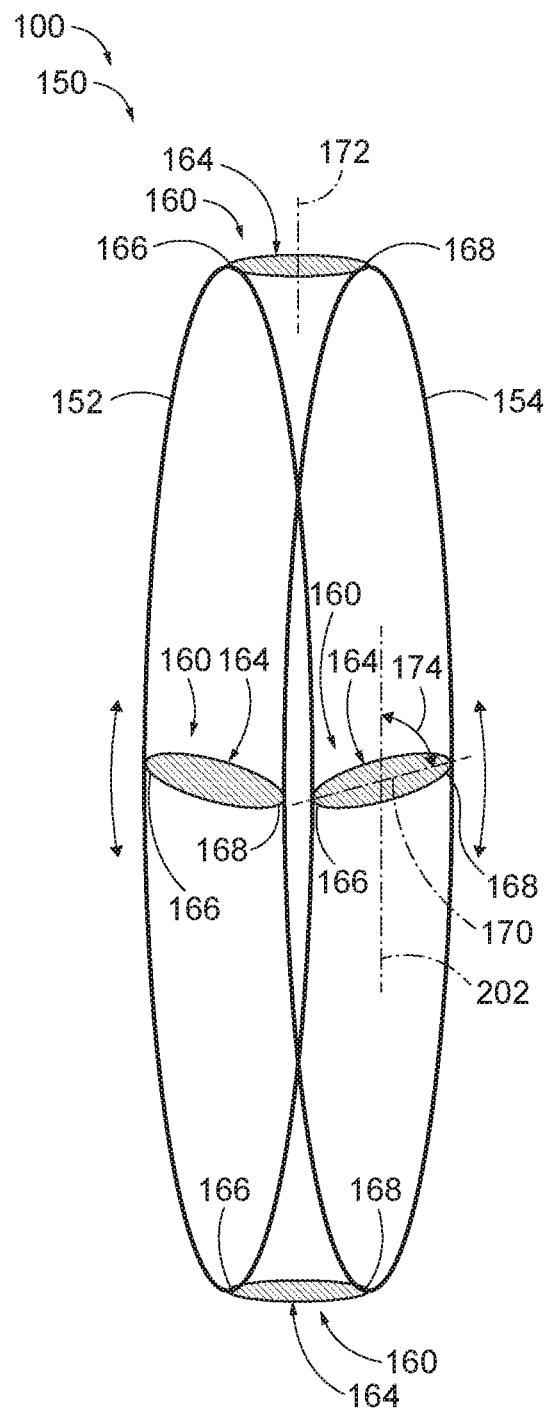
FIG. 7 is a front side isometric elevation view representing an example of a portion of a stator with a plurality of field coils in a first configuration according to the present disclosure.
Figure 8:
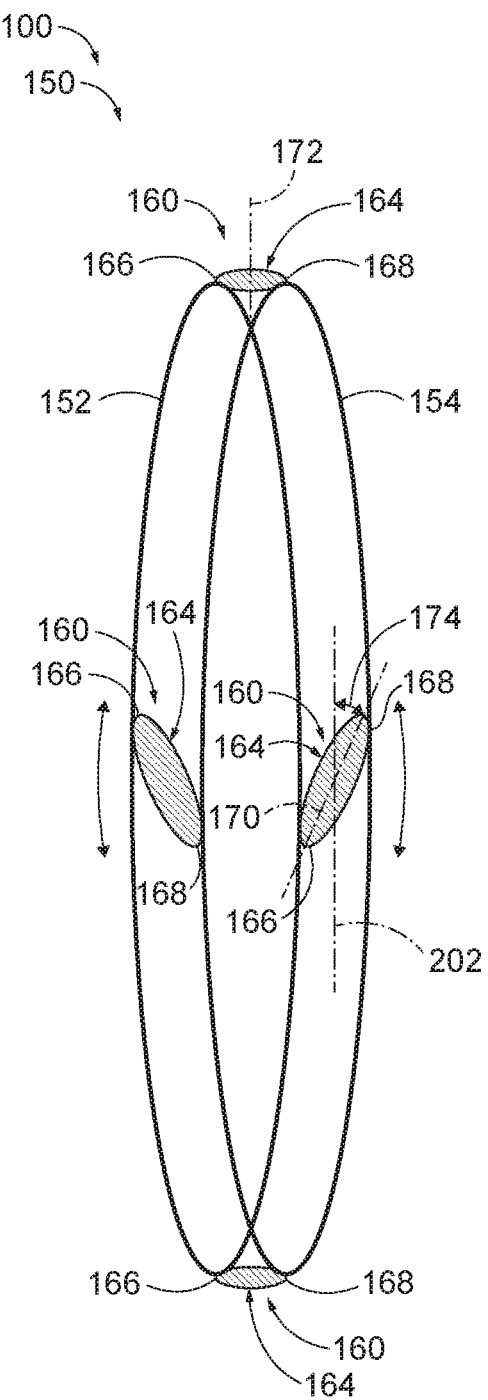
FIG. 8 is a front side isometric elevation view representing the portion of the stator of FIG. 7 with the plurality of field coils in a second configuration according to the present disclosure.

FIGS. 7-8 provide schematic illustrations of a portion of stator 150 in which each field coil 160 is configured to rotate. While each of FIGS. 7-8 schematically illustrates stator 150 as including four field coils 160 for clarity, it is to be understood that FIGS. 7-8 are representative of a portion of stator 150 that may include more than four field coils 160. As schematically illustrated in FIGS. 2 and 7-8, each field coil 160 may have a coil first end 166, a coil second end 168 opposite coil first end 166, and a coil orientation axis 170 that extends between coil first end 166 and coil second end 168, such that each field coil 160 has a coil pitch angle 174 (shown in FIGS. 7-8) that is measured between coil orientation axis 170 and fan plane 202. Each field coil 160 may be configured to rotate about a respective coil pitch axis 172 that extends perpendicular to coil orientation axis 170 to adjust coil pitch angle 174. As schematically illustrated in FIG. 2, coil pitch axis 172 may extend at least substantially parallel to fan plane 202.

Stator 150 may be configured to rotate each field coil 160 about the respective coil pitch axis 172 in any appropriate manner and/or by any appropriate mechanism. As an example, stator 150 may be configured such that the respective coil pitch angles 174 of the plurality of field coils 160 are maintained and/or constrained to be at least substantially equal to one another. As another example, stator 150 may be configured such that coil pitch angle 174 of each field coil 160 remains at least substantially equal to blade pitch angle 222 of each fan blade 210 as coil pitch angle 174 and/or blade pitch angle 222 is adjusted, such as by fan blade pitch controller 230. In some examples, and as schematically illustrated in FIG. 2, rotary electric engine 100 further includes a coil pitch controller 158 configured to selectively and actively rotate each field coil 160 about the respective coil pitch axis 172 to control the respective coil pitch angle 174 of each field coil 160.

In some examples, and as discussed, stator 150 is configured to selectively, actively, and/or dynamically rotate each field coil 160 about the respective coil pitch axis 172 to maintain the respective coil core 164 of each field coil 160 in an orientation that is at least substantially aligned with each rotor magnet 182 when each rotor magnet 182 is proximate to coil core 164 (e.g., during the course of the rotation of rotor 180 relative to stator 150). In such examples, stator 150 may be configured to rotate each field coil 160 in any appropriate manner. As an example, and as schematically illustrated in FIGS. 2 and 5-6, stator 150 further may include a first support ring 152 and a second support ring 154 such that each field coil 160 is pivotally coupled to each of first support ring 152 and second support ring 154. Each field coil 160 may be pivotally coupled to first support ring 152 at a location that is proximate the respective coil first end 166 relative to the respective coil second end 168, and may be pivotally coupled to second support ring 154 at a location that is proximate the respective coil second end 168 relative to the respective coil first end 166.

In an example of stator 150 that includes first support ring 152 and second support ring 154, each of first support ring 152 and second support ring 154 generally is maintained at least substantially parallel to fan plane 202. In this manner, stator 150 may be configured to selectively and dynamically rotate first support ring 152 and/or second support ring 154 about electric engine central axis 102 and relative to nacelle 130 to selectively and dynamically rotate each field coil 160 about the respective coil pitch axis 172. FIGS. 7-8 collectively illustrate an example of such a mechanism. For example, FIG. 7 may be described as illustrating a configuration of four field coils 160 supported by first support ring 152 and second support ring 154 in a first configuration, and FIG. 8 may be described as illustrating the assembly of FIG. 7 subsequent to rotating first support ring 152 relative to second support ring 154 and/or vice versa. More specifically, FIG. 8 illustrates a configuration in which coil pitch angle 174 of each field coil 160 has been decreased relative to the configuration in FIG. 7 via relative rotation of first support ring 152 and/or second support ring 154.

Rotary electric engine 100 and/or stator 150 may be configured to rotate first support ring 152 and/or second support ring 154 in any appropriate manner. As an example, and as schematically illustrated in FIG. 2, stator 150 additionally may include a ring actuator 156 that is configured to rotate first support ring 152 and/or second support ring 154 relative to nacelle 130 about electric engine central axis 102. In such examples, coil pitch controller 158 may be configured to control ring actuator 156 to selectively and dynamically rotate first support ring 152 and/or second support ring 154 about electric engine central axis 102 to selectively and dynamically rotate each field coil 160 about the respective coil pitch axis 172.

As discussed, rotary electric engine 100 generally operates by supplying an electric current to field coils 160 to produce a magnetic field to rotate rotor 180, such as may result in a resistive heating (or Joule heating) of one or more components of rotary electric engine 100. Accordingly, in some examples, rotary electric engine 100 is configured to utilize and/or redirect such thermal energy. For example, it may be desirable that nacelle 130 and/or lip skin 134 be maintained free of ice during operative use of rotary electric engine 100. Accordingly, and as schematically illustrated in FIG. 2, rotary electric engine 100 further may include a nacelle heating structure 136 for heating at least a portion of nacelle 130 during operative use of rotary electric engine 100, such as to inhibit and/or prevent a formation of ice upon nacelle 130. In such examples, and as further schematically illustrated in FIG. 2, nacelle heating structure 136 may include and/or be a thermal coupling structure 138 configured to establish and/or enhance thermal communication between at least a portion of stator 150 and at least a portion of nacelle 130 to convey heat energy from stator 150 to nacelle 130. As a more specific example, and as further schematically illustrated in FIG. 2, thermal coupling structure 138 may be configured to convey heat energy from stator 150 to lip skin 134 of nacelle 130.

Thermal coupling structure 138 may have any appropriate configuration for conveying heat energy from stator 150 to nacelle 130. For example, thermal coupling structure 138 may be in thermal communication with coil wire 176 of each field coil 160 and with at least a portion of nacelle 130, such as lip skin 134. Additionally, thermal coupling structure 138 may have any appropriate structure for conveying heat energy, examples of which include a conduit, a metal conduit, and/or a heat pipe. In some examples, and as further schematically illustrated in FIG. 2, nacelle heating structure 136 additionally includes a heating element 140 that is operatively coupled to nacelle 130 and that is in thermal contact with nacelle 130. In such examples, nacelle heating structure 136 may be configured to heat at least a portion of nacelle 130, such as lip skin 134, either alone or in conjunction with thermal coupling structure 138. Nacelle heating structure 136 may include and/or be any appropriate structure, examples of which include an electric heater and/or a grid of resistors.

Figure 9:
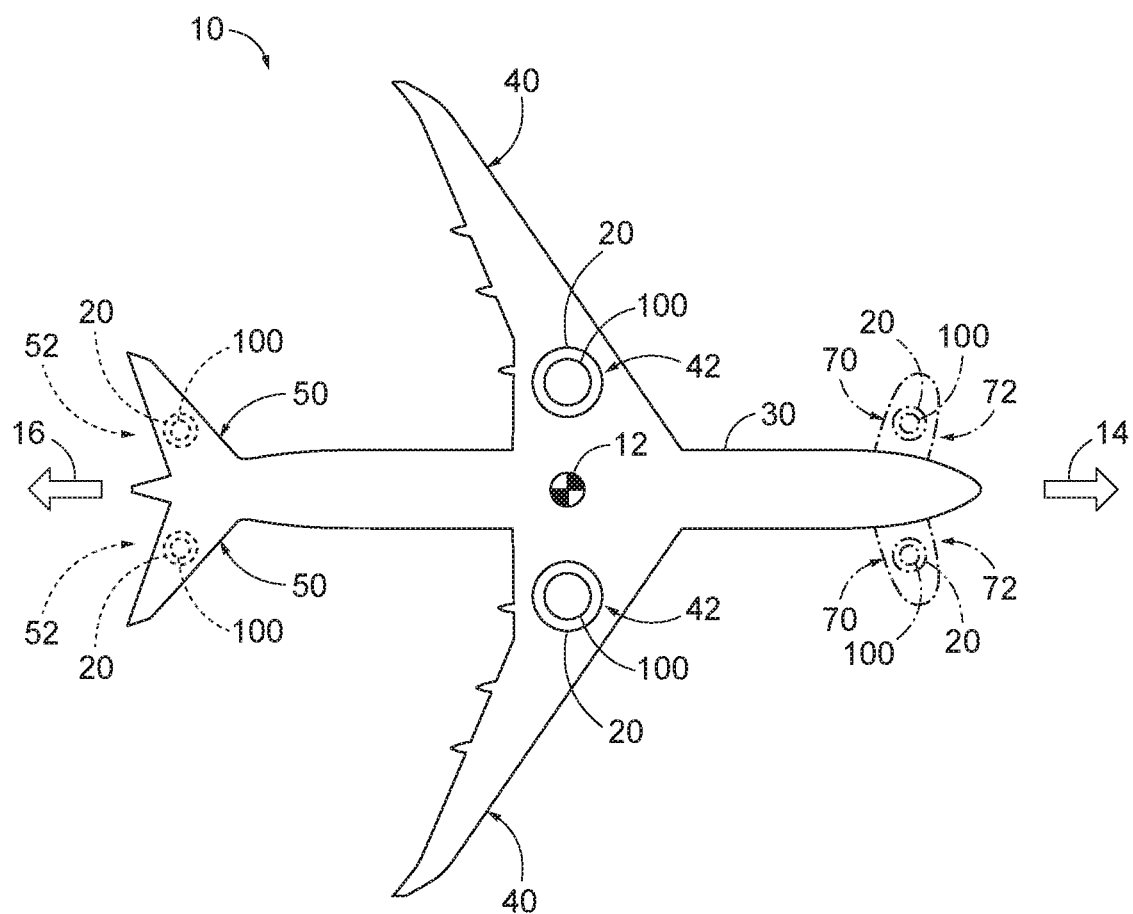
FIG. 9 is a schematic top plan view representing examples of aircraft that include two or more rotary electric engines according to the present disclosure.
Figure 10:
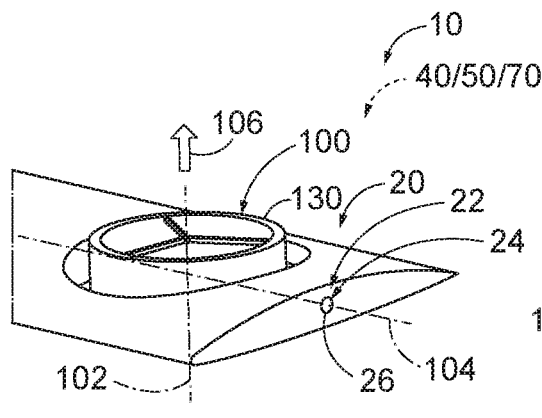
FIG. 10 is a top front top side isometric view representing an example of a rotary electric engine in a vertical lift configuration according to the present disclosure.
Figure 11:
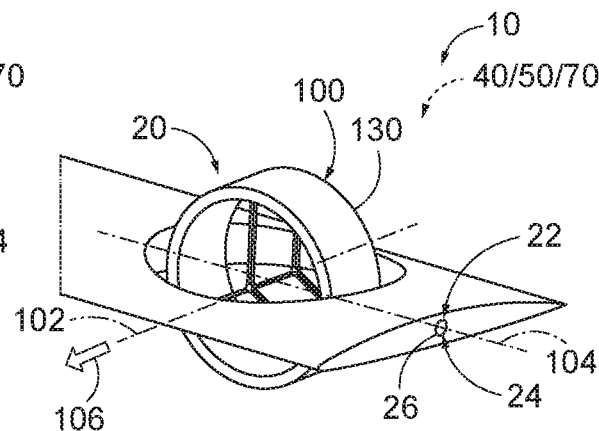
FIG. 11 is a top front side isometric view representing the rotary electric engine of FIG. 10 in a forward thrust configuration according to the present disclosure.

Rotary electric engine 100 may be a component of and/or utilized in conjunction with any appropriate vehicle, such as an aircraft. For example, and as schematically illustrated in FIG. 9, an aircraft 10 that utilizes rotary electric engine 100 may include a fuselage 30, one or more wings 40 operatively coupled to fuselage 30, and one or more instances of rotary electric engine 100. Examples of aircraft 10 that may include and/or utilize rotary electric engine 100 include an airplane, a commercial aircraft, a passenger aircraft, a military aircraft, and/or an unmanned aerial vehicle. In some examples, and as further schematically illustrated in FIG. 9, aircraft 10 includes one or more engine mount regions 20, each of which operatively supports a respective instance of rotary electric engine 100 therein. As used herein, engine mount region 20 may refer to a component and/or region of aircraft 10 (such as a component and/or region of wing 40) that is adjacent to and/or proximal to the respective rotary electric engine 100, and/or may refer to a region and/or volume that is occupied by the respective rotary electric engine 100.

As additionally schematically illustrated in FIG. 9, and as discussed in more detail herein, aspects, components, and/or utilization of aircraft 10 also may be described in terms of a forward direction 14 and an aft direction 16. For example, aircraft 10 generally may be configured to travel along forward direction 14 during operative use thereof. However, this is not required of all examples of aircraft 10, and it is additionally within the scope of the present disclosure that aircraft 10 is not constrained and/or configured to travel along a well-defined forward direction 14.

Aircraft 10 may include engine mount regions 20 and/or rotary electric engines 100 at any appropriate locations. For example, and as schematically illustrated in solid lines in FIG. 9, each wing 40 may include one or more engine mount regions 20. In such examples, and as schematically illustrated in FIG. 9, each rotary electric engine 100 supported within each engine mount region 20 of each wing 40 also may be referred to as a wing rotary electric engine 42. As a more specific example, and as schematically illustrated in solid lines in FIG. 9, aircraft 10 may include two engine mount regions 20 supporting respective wing rotary electric engines 42 positioned in wing(s) 40 and on opposite sides of fuselage 30.

In some examples, and as schematically illustrated in FIG. 9, each wing rotary electric engine 42 may be at least substantially aligned with a center of gravity 12 of aircraft 10 in a forward-aft direction of aircraft 10 (e.g., a direction at least substantially parallel to each of forward direction 14 and aft direction 16). For example, utilizing rotary electric engines 100 according to the present disclosure may enable aircraft 10 to operate at least substantially without a liquid fuel, which otherwise may cause a balance of aircraft 10 to shift during use thereof (i.e., as the liquid fuel is expended and/or redistributed within aircraft 10). In such examples, center of gravity 12 of aircraft 10 may remain at least substantially fixed during operation of aircraft 10, thus enabling wing rotary electric engines 42 to provide stable control of aircraft 10 due to their ensured alignment with center of gravity 12.

In some examples, aircraft 10 additionally or alternative includes one or more engine mount regions 20 at a location other than within wing(s) 40. For example, and as schematically illustrated in FIG. 9, aircraft 10 further may include one or more horizontal stabilizers 50 positioned aft of wing(s) 40 (e.g., spaced apart from wing(s) 40 along aft direction 16), and each horizontal stabilizer 50 may include at least one engine mount region 20 (schematically illustrated in dashed lines in FIG. 9). In such examples, and as schematically illustrated in FIG. 9, each rotary electric engine 100 supported within each engine mount region 20 of each horizontal stabilizer 50 also may be referred to as a horizontal stabilizer rotary electric engine 52. As another example, and as further schematically illustrated in dash-dot lines in FIG. 9, aircraft 10 additionally may include one or more canards 70 positioned forward of wing(s) 40 (e.g., spaced apart from wing(s) 40 along forward direction 14), and each canard 70 may include at least one engine mount region 20. In such examples, and as schematically illustrated in dash-dot lines in FIG. 9, each rotary electric engine 100 supported within each engine mount region 20 of each canard 70 also may be referred to as a canard rotary electric engine 72.

Each engine mount region 20 may support the respective rotary electric engine 100 in any appropriate manner. For example, and with reference to FIGS. 10-13, each rotary electric engine 100 may be configured to rotate with respect to the respective engine mount region 20 about an electric engine pivot axis 104. As a more specific example, each engine mount region 20 may include an electric engine pivotal support 22 that at least partially supports the respective rotary electric engine 100 within engine mount region 20, with electric engine pivotal support 22 being operable to selectively pivot the respective rotary electric engine 100 with respect to engine mount region 20 about the respective electric engine pivot axis 104. In some examples, each electric engine pivotal support 22 includes a pivot shaft 24 that extends at least partially along electric engine pivot axis 104 and that is operatively coupled to the respective rotary electric engine 100 and to the respective engine mount region 20. In some examples, each electric engine pivotal support 22 includes a torque tube 26 that is configured to impart a torque on the corresponding rotary electric engine 100 to rotate the respective rotary electric engine 100 relative to the respective engine mount region 20 about the respective electric engine pivot axis 104.

As illustrated in FIGS. 10-13, each rotary electric engine 100 that is pivotally supported within engine mount region 20 generally is configured to rotate to selectively modify an orientation of electric engine thrust direction 106 during operative use of aircraft 10. As examples, each rotary electric engine 100 that is pivotally supported within engine mount region 20 may be configured to selectively transition between a plurality of configurations defined between and including two or more of a vertical lift configuration (illustrated in FIGS. 10 and 12), in which engine thrust direction 106 is directed at least substantially vertically upward; a forward flight configuration (illustrated in FIGS. 11 and 13), in which electric engine thrust direction 106 is directed at least substantially in forward direction 14; a reverse flight configuration, in which electric engine thrust direction 106 is directed at least substantially in aft direction 16; and a lift counterforce configuration, in which electric engine thrust direction 106 is directed at least substantially vertically downward. In this manner, and as described herein, each rotary electric engine 100 of aircraft 10 may be configured to selectively propel aircraft 10 along a horizontal direction and/or along a vertical direction. In such examples, each rotary electric engine 100 may be configured to rotate about the respective electric engine pivot axis 104 to selectively transition between and/or assume any of the plurality of configurations defined between and including two or more of the vertical lift configuration, the forward flight configuration, the reverse flight configuration, and the lift counterforce configuration.

As used herein, positional terms such as "vertical," "horizontal," "upward," "downward," and the like may be used to describe spatial orientations of aircraft 10, of rotary electric engines 100, and/or of any components thereof in an illustrative, non-limiting manner, and generally refer to a configuration in which aircraft 10 travels in level flight at a constant altitude. Thus, for example, each of wings 40, horizontal stabilizers 50, canards 70, forward direction 14, and aft direction 16 may be described as extending at least substantially in a horizontal direction. As another example, a direction that is described as "vertically upward" may refer to a direction that is antiparallel to a force of gravity, while a direction that is described as "vertically downward" may refer to a direction that is parallel to and/or in the same direction as the force of gravity. However, such descriptions are not intended as describing or implying that aircraft 10 and/or rotary electric engines 100 must always be in a given orientation relative to ground and/or relative to the force of gravity.

Figure 12:
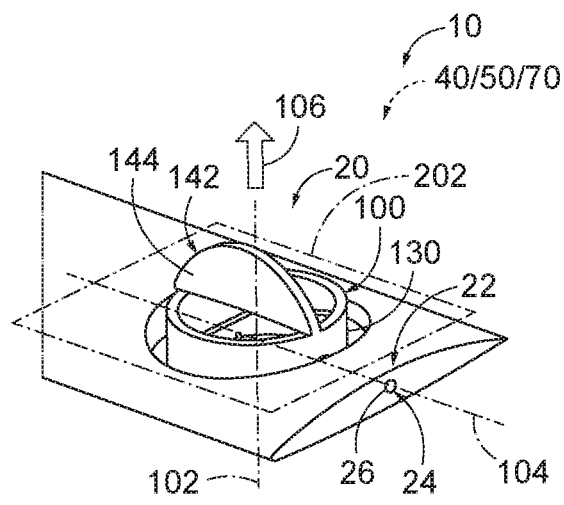
FIG. 12 is a top front side isometric view representing an example of a rotary electric engine that includes a fairing in the vertical lift configuration according to the present disclosure.
Figure 13:
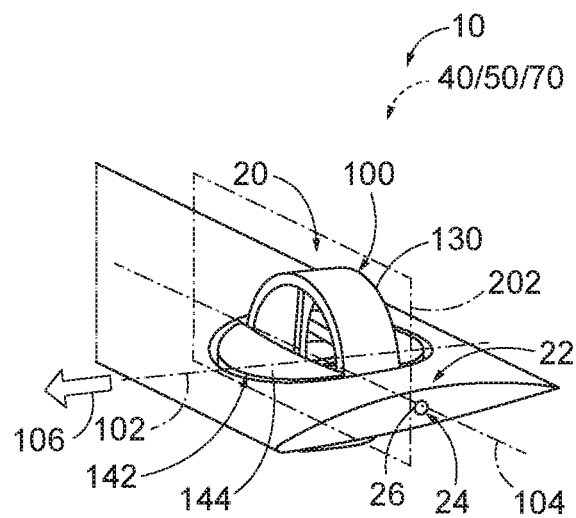
FIG. 13 is a front top side isometric view representing the rotary electric engine of FIG. 12 in the forward thrust configuration according to the present disclosure.

In some examples, and as illustrated in FIGS. 12-13, nacelle 130 of rotary electric engine 100 that is supported within engine mount region 20 includes a fairing 142 that is configured to at least substantially conform to engine mount region 20, such as when rotary electric engine 100 is in the forward flight configuration (as shown in FIG. 13) or in the reverse flight configuration. More specifically, and as shown in FIGS. 12-13, fairing 142 may include a fairing surface 144 that extends at least substantially perpendicular to fan plane 202 such that fairing surface 144 is at least substantially aligned with and/or coextensive with the respective engine mount region 20 when rotary electric engine 100 is in the forward flight configuration or in the reverse flight configuration. In this manner, and as illustrated in FIG. 13, when rotary electric engine 100 is in the forward flight configuration (shown in FIG. 13) or in the reverse flight configuration, fairing surface 144 effectively may operate as a component of engine mount region 20 (e.g., a region of aircraft 10, of wing 40, of horizontal stabilizer 50, and/or of canard 70 that is proximate to rotary electric engine 100), such as to augment and/or enhance an aerodynamic property of engine mount region 20. As more specific examples, when rotary electric engine 100 is in the forward flight configuration or in the reverse flight configuration, fairing 142 and/or fairing surface 144 may operate to increase a lift force, increase an aerodynamic control authority, and/or decrease a drag force relative to that produced by an otherwise identical rotary electric engine 100 that lacks fairing 142.

Figure 14:
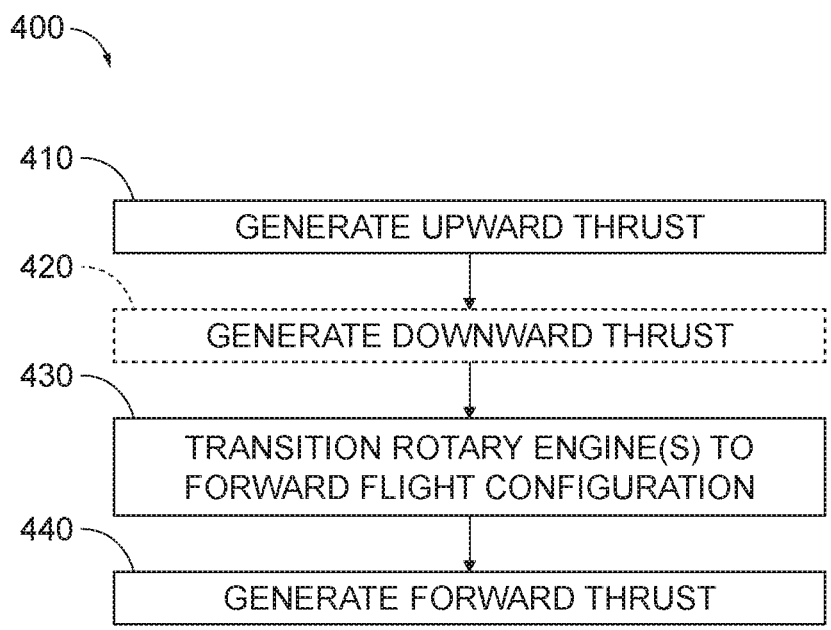
FIG. 14 is a flowchart depicting methods of operating an aircraft according to the present disclosure.

FIG. 14 is a flowchart depicting methods 400, according to the present disclosure, of operating an example of aircraft 10 that includes rotary electric engine(s) 100 pivotally mounted within respective engine mount region(s) 20. As shown in FIG. 14, a method 400 includes generating, at 410, an upward thrust with one or more rotary electric engines (such as rotary electric engine(s) 100) in the vertical lift configuration to vertically lift an aircraft (such as aircraft 10) from a ground surface. Method 400 additionally includes transitioning, at 430, one or more of the rotary electric engines from the vertical lift configuration to the forward flight configuration, and generating, at 440, a forward thrust with one or more of the rotary electric engines in the forward flight configuration to propel the aircraft in a forward direction (such as forward direction 14). For example, the transitioning the one or more rotary electric engines at 430 may include transitioning one or more wing rotary electric engines (such as wing rotary electric engines 42) from the vertical lift configuration to the forward flight configuration. In this manner, an example of aircraft 10 that performs and/or is operated in accordance with methods 400 also may be referred to as a vertical take-off and landing (VTOL) aircraft.

The generating the upward thrust at 410 may be performed in any appropriate manner and/or with rotary electric engines at any appropriate location on the aircraft. As an example, the generating the upward thrust at 410 may be performed at least partially with the one or more wing rotary electric engines in the vertical lift configuration. Additionally or alternatively, the generating the upward thrust at 410 may be performed at least partially with one or more horizontal stabilizer rotary electric engines (such as horizontal stabilizer rotary electric engines 52) in the vertical lift configuration and/or may be performed with one or more canard rotary electric engines (such as canard rotary electric engines 72) in the vertical lift configuration. Stated differently, the generating the upward thrust at 410 may include generating the upward thrust with the wing rotary electric engine(s) concurrently with generating the upward thrust the horizontal stabilizer rotary electric engine(s) and/or with the canard rotary electric engine(s).

In some examples, and as further shown in FIG. 14, method 400 additionally includes, at least partially concurrently with the generating the upward thrust at 410, generating, at 420, a downward thrust with one or more of the rotary electric engines. For example, the generating the upward thrust at 410 may include generating a vertical lift force that has a tendency to pitch the aircraft about an axis perpendicular to the forward-aft direction. In such examples, the generating the downward thrust at 420 may operate to counteract such a pitching tendency, thus facilitating stable flight of the aircraft. As more specific examples, the generating the downward thrust at 420 may be performed at least partially with the horizontal stabilizer rotary electric engine(s) in the lift counterforce configuration and/or with the canard rotary electric engine(s) in the lift counterforce configuration, such as while the wing rotary electric engine(s) operate in the vertical lift configuration.

Figure 15:
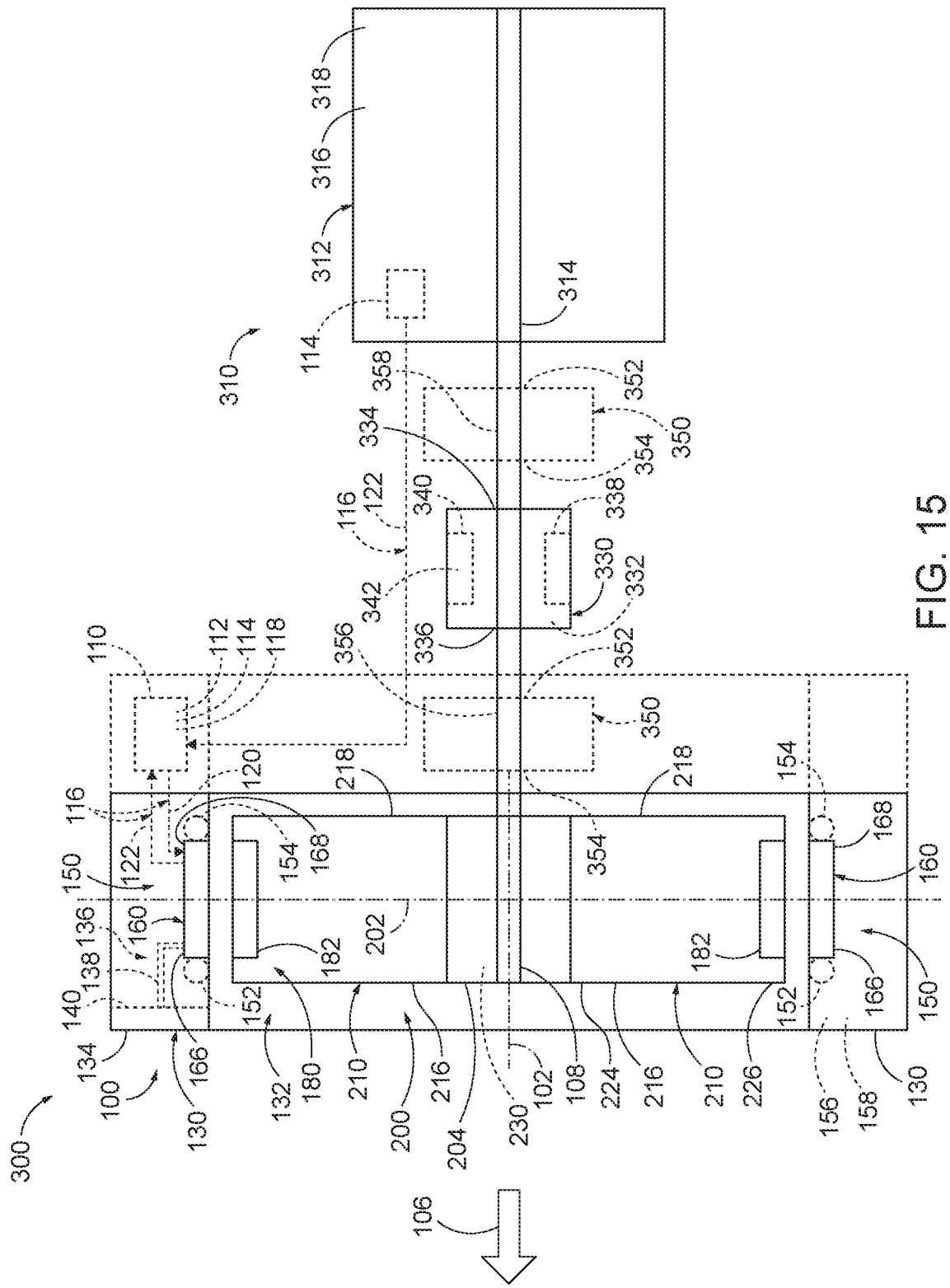
FIG. 15 is a schematic side elevation view representing examples of hybrid turbine engines according to the present disclosure.
Figure 16:
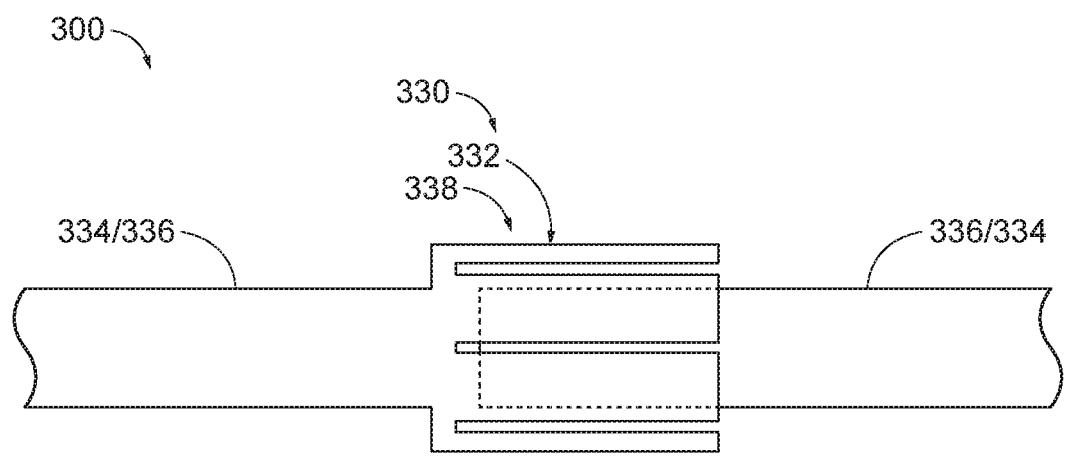
FIG. 16 is a schematic side elevation view representing an example of a clutch according to the present disclosure.
Figure 17:
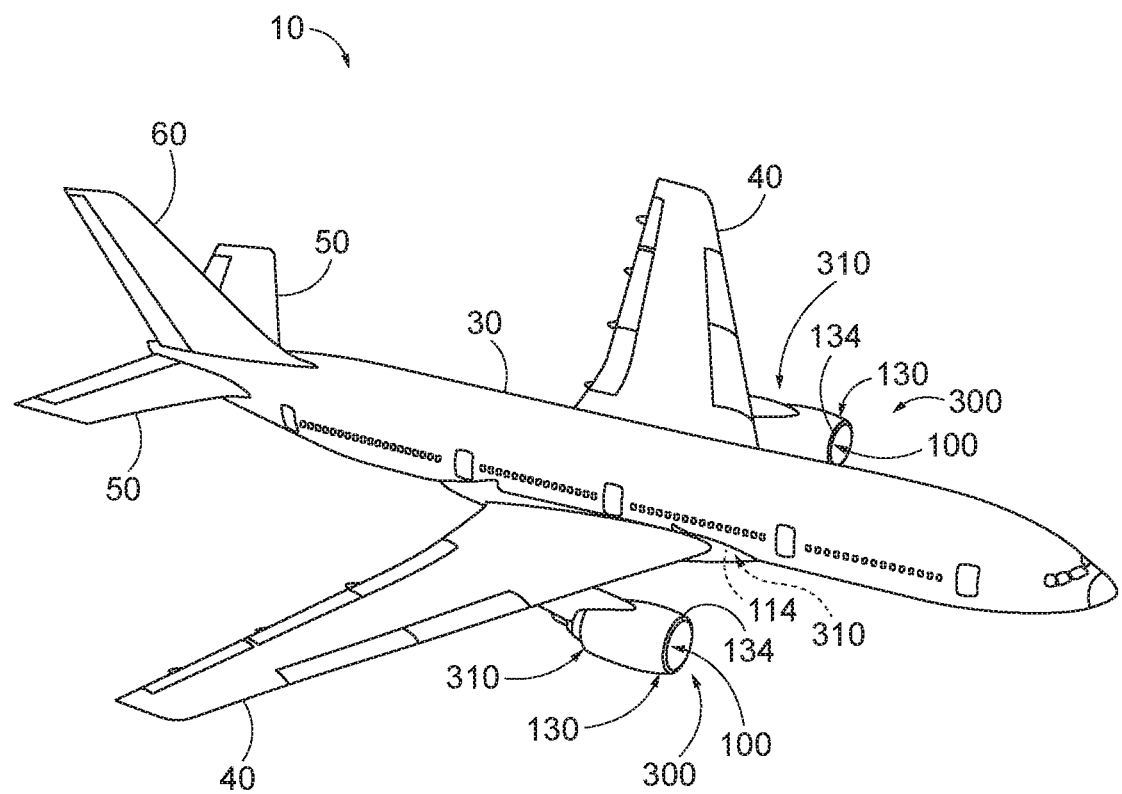
FIG. 17 is an illustration of an aircraft that may include and/or utilize hybrid turbine engines according to the present disclosure.
Figure 18:
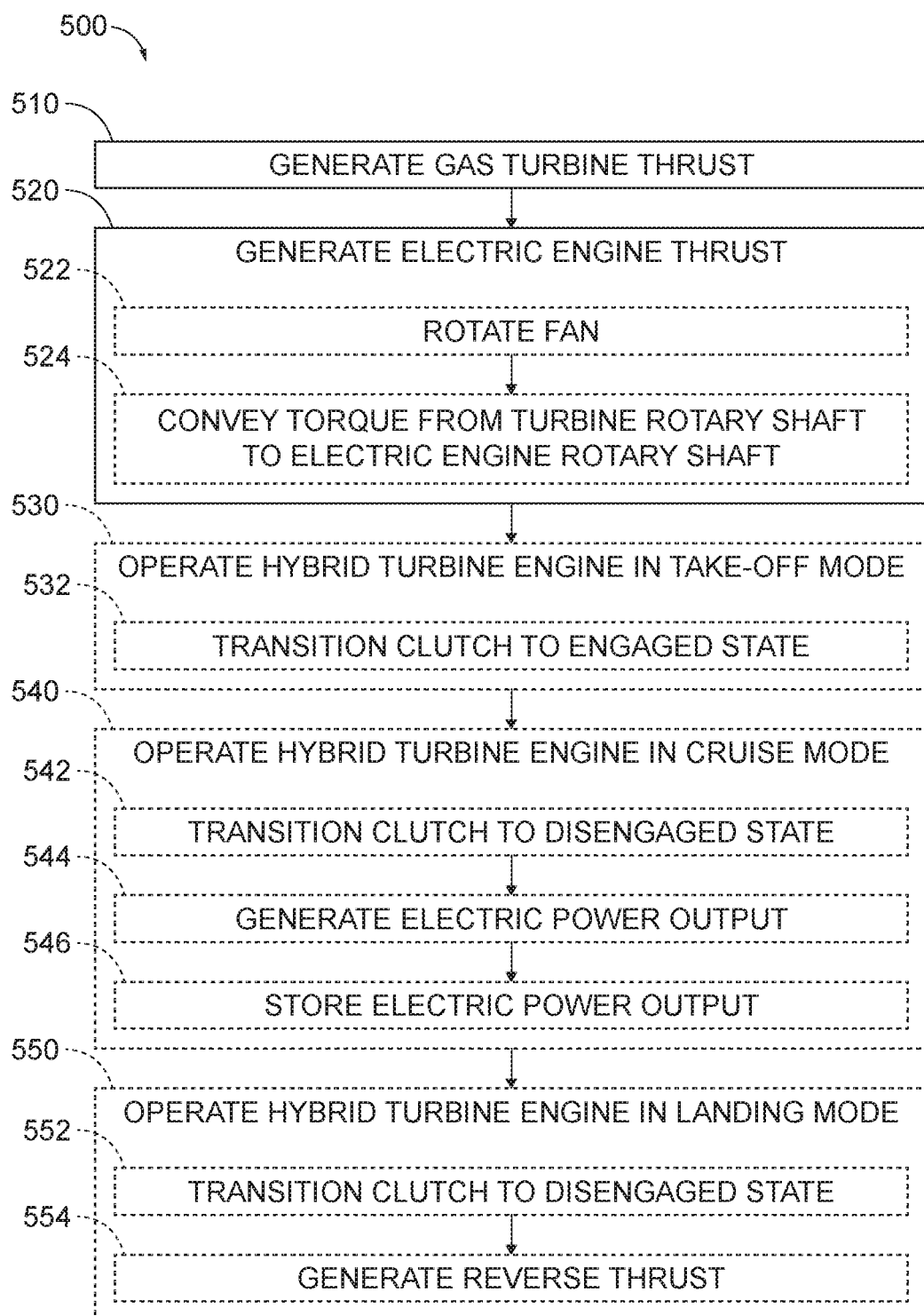
FIG. 18 is a flowchart depicting methods of operating an aircraft that includes a hybrid turbine engine according to the present disclosure.

Turning now to FIGS. 15-18, rotary electric engines 100 according to the present disclosure also may be utilized in the context of and/or as a component of a hybrid turbine engine 300. Specifically, FIGS. 15-16 schematically illustrate hybrid turbine engines 300 and/or components thereof, while FIG. 17 illustrates an example of aircraft 10 that may include and/or utilize hybrid turbine engine 300, and FIG. 18 depicts methods 500 of operating aircraft 10 that include hybrid turbine engine 300.

As schematically illustrated in FIG. 15, a hybrid turbine engine 300 according to the present disclosure includes a gas turbine engine 310 with a turbine 312 as well as rotary electric engine 100 such that rotary electric engine 100 is mechanically and/or electrically coupled to gas turbine engine 310, as described herein. In some examples, and as discussed herein, gas turbine engine 310 is configured to generate a gas turbine thrust. In some examples, and as additionally discussed herein, gas turbine engine 310 additionally or alternatively includes electric generator 114, which in turn generates electric power output 122 to at least partially power rotary electric engine 100. In some examples, and as discussed herein, gas turbine engine 310 is mechanically coupled to rotary electric engine 100, such as to provide a mechanical torque to fan 200.

FIG. 15 schematically illustrates an example of hybrid turbine engine 300 in which rotary electric engine 100 is mechanically coupled to gas turbine engine 310 and in which rotary electric engine 100 optionally is electrically coupled to gas turbine engine 310. Specifically, and as schematically illustrated in FIG. 15, gas turbine engine 310 may include a turbine rotary shaft 314 such that turbine 312 is operatively coupled to turbine rotary shaft 314, and hybrid turbine engine 300 further may include an electric engine rotary shaft 108 that is operatively coupled to fan 200. In such examples, and as schematically illustrated in FIGS. 15-16, hybrid turbine engine 300 additionally includes a clutch 330 with a clutch input 334 that is operatively coupled to turbine rotary shaft 314 (shown in FIG. 15) and a clutch output 336 that is operatively coupled to electric engine rotary shaft 108 (shown in FIG. 15).

Clutch 330 is configured to be selectively transitioned between an engaged state, in which clutch input 334 is mechanically and/or rotationally coupled to clutch output 336, and a disengaged state, in which clutch input 334 is mechanically and/or rotationally decoupled from clutch output 336. In this manner, electric engine rotary shaft 108 may be described as being operatively mechanically and/or rotationally coupled to turbine rotary shaft 314 when clutch 330 is in the engaged state, and electric engine rotary shaft 108 may be described as being decoupled from turbine rotary shaft 314 when clutch 330 is in the disengaged state. Accordingly, and as described in more detail herein, hybrid turbine engine 300 may be configured to operate at least substantially as a turbofan engine when clutch 330 is in the engaged state, and/or may be configured to operate at least substantially under the power of rotary electric engine 100 or of gas turbine engine 310 alone when clutch 330 is in the disengaged state.

Gas turbine engine 310 may have any appropriate structure and/or components. For example, and as schematically illustrated in FIG. 15, gas turbine engine 310 may include a combustion chamber 316, such as may be positioned upstream from turbine 312, and/or a compressor 318, such as may be positioned upstream from combustion chamber 316. Combustion chamber 316 and compressor 318, when present, generally operate to compress and combust a fuel-air mixture to generate a thrust. Compressor 318 may be operatively coupled to turbine rotary shaft 314 and/or may be configured to rotate with turbine rotary shaft 314. Additionally or alternatively, and as further schematically illustrated in FIG. 15, gas turbine engine 310 and/or turbine 312 may include electric generator 114, such as may be configured to supply electric power output 122 to electric power system 110 via power supply conduit 116.

As used herein, positional terms such as "upstream" and "downstream," as used to describe relative positions and/or locations of components of hybrid turbine engine 300, generally refer to directions with respect to an airflow through hybrid turbine engine 300. For example, and as schematically illustrated in FIG. 15, gas turbine engine 310 may be described as being positioned downstream from rotary electric engine 100.

Clutch 330 may include any suitable structure that may be adapted, configured, designed, and/or constructed to include clutch input 334 and clutch output 336, as schematically illustrated in FIGS. 15-16, and/or to define at least the engaged state and the disengaged state. Examples of clutch 330 include an overrunning clutch, a one-way clutch, a one-way tapered clutch, a tooth clutch, and/or a synchronized clutch.

As schematically illustrated in FIG. 15, hybrid turbine engine 300 and/or clutch 330 thereof may include a synchronization structure 340. Synchronization structure 340, when present, may be configured to synchronize clutch input 334 and clutch output 336, such as to permit clutch 330 to transition from the disengaged state to the engaged state and/or from the engaged state to the disengaged state while clutch input 334 and/or clutch output 336 rotates. An example of synchronization structure 340 includes a speed controller 342 configured to control a rotational velocity of rotary electric engine 100, of rotor 180, and/or of fan 200 to synchronize clutch output 336 to clutch input 334. This may include synchronization of clutch output 336 to clutch input 334 to the same, or similar, respective rotational velocities, such as to permit and/or facilitate low-friction engagement and/or disengagement of clutch 330 at any suitable synchronized rotational velocity.

It is within the scope of the present disclosure that clutch 330 may include and/or be an automatic, or an automatically actuated, clutch 330. Such an automatic clutch 330 may be configured to automatically rotationally couple and/or decouple clutch input 334 and clutch output 336 in any appropriate conditions. For example, such an automatic clutch 330 may be configured to automatically rotationally couple clutch input 334 to clutch output 336 when a clutch input rotational velocity of clutch input 334 is greater than a clutch output rotational velocity of clutch output 336. Such an automatic clutch 330 additionally or alternatively may be configured to automatically rotationally decouple clutch input 334 from clutch output 336 when the clutch input rotational velocity is less than the clutch output rotational velocity.

It is also within the scope of the present disclosure that clutch 330 may include and/or be a selectively actuated clutch 330. Such a selectively actuated clutch 330 may be configured to be selectively actuated between the engaged state and the disengaged state, such as by an operator, or by a control system, of hybrid turbine engine 300. This may be accomplished in any suitable manner. As an example, and with continued reference to FIG. 15, clutch 330 may include an engagement structure 338 configured to selectively transition clutch 330 between the engaged state and the disengaged state. Examples of engagement structure 338 include an actuator, a lever, an electrically actuated engagement structure, a mechanically actuated engagement structure, and/or a hydraulically actuated engagement structure. As a more specific example, and as schematically illustrated in FIG. 16, engagement structure 338 may include and/or be a collet 332 that is operatively coupled to one of clutch input 334 and clutch output 336 and that is configured to selectively engage the other of clutch input 334 and clutch output 336 to transition clutch 330 from the disengaged state to the engaged state. In some examples, collet 332 is an electromagnetically actuated collet. Such an electromagnetically actuated collet 332 may be biased toward the engaged state and may be configured such that providing an electric current to collet 332 causes collet 332 release, thus operating to transition clutch 330 from the engaged state to the disengaged state. In this manner, such an electromagnetically actuated collet 332 may provide and/or operate as a failsafe mechanism that automatically transitions clutch 330 to the engaged state in the event that the electric current provided to collet 332 is inadvertently suspended or interrupted.

With continued reference to FIG. 15, electric engine rotary shaft 108 and turbine rotary shaft 314 may have any appropriate configuration and/or relative orientation. For example, electric engine rotary shaft 108 may be parallel to and/or axially aligned with turbine rotary shaft 314. As another example, electric engine rotary shaft 108 may be axially offset from turbine rotary shaft 314.

As schematically illustrated in solid lines in FIG. 15, clutch input 334 may be directly, or directly and operatively, coupled to turbine rotary shaft 314. As also schematically illustrated in solid lines in FIG. 15, clutch output 336 may be directly, or directly and operatively, coupled to electric engine rotary shaft 108. However, such a configuration is not required of all examples of hybrid turbine engine 300, and it is additionally within the scope of the present disclosure that one or more structures may extend between, or operatively couple, clutch input 334 to turbine rotary shaft 314. Additionally or alternatively, one or more structures may extend between, or operatively couple, clutch output 336 to electric engine rotary shaft 108.

As an example, and as schematically illustrated in dashed lines in FIG. 15, hybrid turbine engine 300 may include at least one gear box 350. Gear box 350, when present, may be positioned between rotary electric engine 100 and gas turbine engine 310 and/or between electric engine rotary shaft 108 and turbine rotary shaft 314. When present, gear box 350 generally is configured to provide a predetermined rotational frequency ratio between electric engine rotary shaft 108 and turbine rotary shaft 314 when clutch 330 is in the engaged state. As examples, gear box 350 may enable and/or facilitate operating turbine 312 at a rotational velocity that is greater or a smaller than that of fan 200.

It is within the scope of the present disclosure that gear box 350 may be positioned between, or may operatively couple, turbine rotary shaft 314 and clutch 330. Stated another way, clutch input 334 may be operatively coupled to turbine rotary shaft 314 via gear box 350. In such an example, and as schematically illustrated in FIG. 15, gear box 350 may include a gear box input 352, which may be operatively coupled, or directly operatively coupled, to turbine rotary shaft 314. In addition, gear box 350 may include an output stub shaft 358, which may be operatively coupled, or directly operatively coupled, to clutch input 334.

Additionally or alternatively, it is also within the scope of the present disclosure that gear box 350 may be positioned between, or may operatively couple, clutch 330 and electric engine rotary shaft 108. Stated another way, clutch output 336 may be operatively coupled to electric engine rotary shaft 108 via gear box 350. In such an example, and as further schematically illustrated in FIG. 15, gear box 350 may include an input stub shaft 356, which may be operatively coupled, or directly operatively coupled, to clutch output 336. In addition, gear box 350 may include a gear box output 354, which may be operatively coupled, or directly operatively coupled, to electric engine rotary shaft 108.

Hybrid turbine engine 300 may be a component of and/or utilized in conjunction with any appropriate vehicle, such as an aircraft. For example, and as illustrated in FIG. 17, an aircraft 10 that utilizes hybrid turbine engine 300 may include fuselage 30, one or more wings 40 operatively coupled to fuselage 30, and one or more instances of hybrid turbine engine 300 operatively coupled to wing(s) 40. As further illustrated in FIG. 17, such an aircraft 10 additionally may include one or more horizontal stabilizers 50 and/or a vertical stabilizer 60. Examples of aircraft 10 that may include and/or utilize hybrid turbine engine 300 include an airplane, a commercial aircraft, a passenger aircraft, a military aircraft, and/or an unmanned aerial vehicle. In some examples, aircraft 10 and/or hybrid turbine engine 300 may be configured such that nacelle 130 of each rotary electric engine 100 at least substantially encloses gas turbine engine 310. In other examples, rotary electric engine 100 may be separated from gas turbine engine 310. For example, and as shown in FIG. 17, rotary electric engine 100 may be supported by wing(s) 40, and gas turbine engine 310 may be supported by fuselage 30. In some examples that employ such a configuration, rotary electric engine 100 of hybrid turbine engine 300 operates to produce a thrust to propel aircraft 10, while gas turbine engine and/or electric generator 114 thereof operates to generate electric power output 122 to power rotary electric engine 100. Such a configuration may serve to minimize a weight of a portion of hybrid turbine engine 300 that is supported by wing 40. In such an example, hybrid turbine engine 300 may lack one or more of turbine rotary shaft 314, electric engine rotary shaft 108, and clutch 330.

FIG. 18 is a flowchart depicting methods 500, according to the present disclosure, of operating an example of an aircraft (such as aircraft 10) that includes a hybrid turbine engine (such as hybrid turbine engine 300). As shown in FIG. 18, a method 500 of operating such an aircraft includes generating, at 510, a gas turbine thrust with a gas turbine engine (such as gas turbine engine 310) and generating, at 520, an electric engine thrust with a rotary electric engine (such as rotary electric engine 100). The generating the gas turbine thrust at 510 and the generating the electric engine thrust at 520 may be performed at least partially concurrently, and may be performed with a clutch (such as clutch 330) in the engaged state or in the disengaged state.

In some examples, and as shown in FIG. 18, the generating the electric engine thrust at 520 includes rotating, at 522, a fan (such as fan 200) of the rotary electric engine at least partially via a magnetic interaction between a stator (such as stator 150) and a rotor (such as rotor 180). In such examples, and as discussed herein, the rotating the fan at 522 may include supplying an electric current to stator 150 such that the generating the electric engine thrust at 520 includes generating the thrust at least partially, and optionally fully, with an electrical energy source. Additionally or alternatively, and as further shown in FIG. 18, the generating the electric engine thrust at 520 may be performed with the clutch in the engaged state and may include conveying, at 524, a torque from a turbine rotary shaft (such as turbine rotary shaft 314) to an electric engine rotary shaft (such as electric engine rotary shaft 108) to rotate the fan of the rotary electric engine. In such an example, the gas turbine engine may be described as supplying at least a portion of the energy to drive the fan to generate the electric engine thrust.

In some examples, and as shown in FIG. 18, method 500 additionally includes operating, at 530, the hybrid turbine engine in a take-off mode in which the aircraft accelerates and gains altitude. The operating the hybrid turbine engine in the take-off mode may be performed in any appropriate manner and with the hybrid turbine engine in any appropriate configuration. For example, the operating the hybrid turbine engine in the take-off mode may be at least partially performed with the clutch in the engaged state, and/or may include transitioning, at 532, the clutch to the engaged state. Such a configuration may enable the hybrid turbine engine to operate in a state of maximum thrust, such as by utilizing the gas turbine engine to generate the gas turbine thrust as well as to at least partially drive the fan of the rotary electric engine to generate the electric engine thrust.

In some examples, and as additionally shown in FIG. 18, method 500 further may include operating, at 540, the hybrid turbine engine in a cruise mode in which a velocity of the aircraft (e.g., an airspeed and/or a ground speed) and/or an altitude of the aircraft (e.g., above ground level and/or above sea level) remains at least substantially constant. As used herein, the aircraft generally may be described as being in the cruise mode only when both of the velocity and the altitude of the aircraft are nonzero (i.e., when the aircraft is both airborne and in forward flight). In some examples, the operating the hybrid turbine engine in the cruise mode at 540 may be at least partially performed with the clutch in the disengaged state, and/or may include transitioning, at 542, the clutch to the disengaged state. Additionally or alternatively, and as shown in FIG. 18, the operating the hybrid turbine engine in the cruise mode at 540 may include generating, at 544, an electric power output (such as electric power output 122) with an electric generator (such as electric generator 114). In such examples, the operating the hybrid turbine engine in the cruise mode at 540 may include the rotating the fan at 522 at least partially by utilizing the electric power output to produce the magnetic interaction between the stator and the rotor. As a more specific example, in which gas turbine engine 310 (and/or a turbine, such as turbine 312, thereof) includes the electric generator, the operating the hybrid turbine engine in the cruise mode at 540 may be performed with the clutch in the disengaged state and may include generating the electric power output with the turbine, optionally without utilizing the gas turbine engine to produce the gas turbine thrust. In this manner, the gas turbine engine may operate substantially to perform the generating the electric power output at 544, and the electric power output may be utilized to perform the rotating the fan at 522 to perform the generating the electric engine thrust at 520. Additionally or alternatively, and as further shown in FIG. 18, the operating the hybrid turbine engine in the cruise mode at 540 may include storing, at 546, the electric power output in an energy storage device (such as energy storage device 112).

In some examples, and as further shown in FIG. 18, method 500 further may include operating, at 550, the hybrid turbine engine in a landing mode in which the aircraft decelerates and returns to ground (e.g., reduces its altitude). In some examples, the operating the hybrid turbine engine in the landing mode at 550 may be at least partially performed with the clutch in the disengaged state, and/or may include transitioning, at 552, the clutch to the disengaged state. The operating the hybrid turbine engine at 550 may include any appropriate steps for reducing a speed and/or altitude of the aircraft. As examples, and with continued reference to FIG. 18, the operating the hybrid turbine engine in the landing mode at 550 may include, with the clutch in the disengaged state, the generating the gas turbine thrust at 510, and/or may include generating, at 554, a reverse thrust with the rotary electric engine. In such examples, the generating the reverse thrust at 554 may include rotating the fan of the rotary electric engine to produce a thrust that operates to decelerate the aircraft relative to ground, such as via specific configuration and/or coordination of the electric current supplied to the stator.

In some examples, the operating the hybrid turbine engine in the landing mode at 550 includes the generating the electric power output at 544. As an example, the rotary electric engine may include the electric generator, and the operating the hybrid turbine engine in the landing mode at 550 may include operating the rotary electric engine in a "windmill" mode in which an incoming air stream operates to rotate the fan to generate the electric power output with the electric generator. As another example, the gas turbine engine and/or the turbine may include the electric generator, and the operating the hybrid turbine engine in the landing mode at 550 may include generating the electric power output with the turbine.

Illustrative, non-exclusive examples of inventive subject matter according to the present disclosure are described in the following enumerated paragraphs:

A1. A rotary electric engine (100) for providing thrust to an aircraft (10) via a rim-driven fan (200), the rotary electric engine (100) comprising:

a fan (200) configured to rotate about an electric engine central axis (102) of the rotary electric engine (100) to generate the thrust along an electric engine thrust direction (106);

a nacelle (130) that at least substantially encompasses the fan (200);

a stator (150) operatively coupled to the nacelle (130); and a rotor (180) operatively coupled to the fan (200);

wherein the fan (200) includes a central hub (204) and a plurality of fan blades (210) extending from the central hub (204); wherein the plurality of fan blades (210) extend at least substantially within a fan plane (202); wherein each fan blade (210) of the plurality of fan blades (210) includes a blade root (224) that is operatively coupled to the central hub (204) and a blade tip (226) opposite the blade root (224); wherein the rotor (180) includes a plurality of rotor magnets (182), each rotor magnet (182) operatively coupled to a respective blade tip (226) of a respective fan blade (210) of the plurality of fan blades (210); wherein the stator (150) includes a plurality of field coils (160); and wherein the stator (150) is configured such that, during operative use of the rotary electric engine (100), magnetic interaction between the plurality of field coils (160) and the plurality of rotor magnets (182) operates to rotate the fan (200) about the electric engine central axis (102) and to generate the thrust.

A2. The rotary electric engine (100) of paragraph A1, wherein each field coil (160) of the plurality of field coils (160) includes a coil core (164) and a coil wire (176) wrapped around the coil core (164).

A3. The rotary electric engine (100) of paragraph A2, wherein the coil core (164) includes one or more of a ferromagnetic material, a ferrite, a ferromagnetic ceramic compound, and iron.

A4. The rotary electric engine (100) of any of paragraphs A2-A3, wherein each field coil (160) of the plurality of field coils (160) is configured such that passing an electric current through the coil wire (176) operates to magnetize the coil core (164) and to generate a magnetic field proximate the field coil (160).

A5. The rotary electric engine (100) of any of paragraphs A2-A4, wherein, during operative use of the rotary electric engine (100), each field coil (160) of the plurality of field coils (160) exerts one or both of an attractive magnetic force and a repulsive magnetic force upon each of one or more rotor magnets (182) of the plurality of rotor magnets (182) to rotate the fan (200) about the electric engine central axis (102).

A6. The rotary electric engine (100) of any of paragraphs A1-A5, wherein the number of field coils (160) in the plurality of field coils (160) is equal to the number of rotor magnets (182) in the plurality of rotor magnets (182).

A7. The rotary electric engine (100) of any of paragraphs A1-A5, wherein the number of field coils (160) in the plurality of field coils (160) is one of:

(i) smaller than the number of rotor magnets (182) in the plurality of rotor magnets (182); or (ii) greater than the number of rotor magnets (182) in the plurality of rotor magnets (182).

A8. The rotary electric engine (100) of any of paragraphs A1-A7, wherein the plurality of field coils (160) is at least substantially contained within the nacelle (130).

A9. The rotary electric engine (100) of any of paragraphs A1-A8, wherein each rotor magnet (182) of the plurality of rotor magnets (182) includes one or more of a permanent magnet, an electromagnet, a ferromagnetic material, and a rare earth magnet.

A10. The rotary electric engine (100) of any of paragraphs A1-A9, further comprising an electric power system (110) configured to provide an electric power input (120) to the stator (150).

A11. The rotary electric engine (100) of paragraph A10, wherein the electric power system (110) is configured to provide the electric power input (120) to each field coil (160) of the plurality of field coils (160).

A12. The rotary electric engine (100) of any of paragraphs A10-A11, wherein the electric power input (120) is configured to rotate the rotor (180) relative to the stator (150) at a selected fan rotational velocity.

A13. The rotary electric engine (100) of any of paragraphs A10-A12, when dependent from paragraph A2, wherein the electric power input (120) includes an electric current that is supplied to the respective coil wire (176) of each field coil (160) of the plurality of field coils (160).

A14. The rotary electric engine (100) of paragraph A13, wherein the electric power input (120) is configured to coordinate the electric current that is supplied to the respective coil wire (176) of each field coil (160) of the plurality of field coils (160) to rotate the fan (200) at a/the selected fan rotational velocity.

A15. The rotary electric engine (100) of any of paragraphs A13-A14, wherein the electric power system (110) is configured to selectively provide each field coil (160) of the plurality of field coils (160) with a respective electric power input (120) such that the plurality of field coils (160) are magnetized at least partially sequentially.

A16. The rotary electric engine (100) of any of paragraphs A13-A15, wherein the electric power system (110) is configured to selectively provide each field coil (160) of the plurality of field coils (160) with a respective electric power input (120) such that the plurality of field coils (160) are magnetized at least partially concurrently.

A17. The rotary electric engine (100) of any of paragraphs A10-A16, wherein the electric power system (110) includes an energy storage device (112) configured to:

(i) provide the electric power input (120) to the stator (150); and (ii) receive and store an electric power output (122) that is generated by an electric generator (114).

A18. The rotary electric engine (100) of paragraph A17, wherein the rotary electric engine (100) includes the electric generator (114).

A19. The rotary electric engine (100) of paragraph A18, wherein the electric generator (114) includes the stator (150) and the rotor (180).

A20. The rotary electric engine (100) of any of paragraphs A17-A18, wherein the electric generator (114) is one or both of spaced apart from the nacelle (130) and exterior to the nacelle (130).

A21. The rotary electric engine (100) of any of paragraphs A17-A20, wherein the electric power system (110) includes at least one power supply conduit (116) configured to one or both of:

(i) convey the electric power input (120) from the energy storage device (112) to the stator (150); and (ii) receive the electric power output (122) from the electric generator (114).

A22. The rotary electric engine (100) of any of paragraphs A17-A21, wherein the electric power system (110) includes a power conditioner (118) configured to:

(i) receive an unconditioned electric power input (120) from the energy storage device (112), condition the unconditioned electric power input (120) to produce a conditioned electric power input (120), and provide the conditioned electric power input (120) to the stator (150); and (ii) receive an unconditioned power output from the electric generator (114), condition the unconditioned electric power output (122) to produce a conditioned power output, and provide the conditioned electric power output (122) to the energy storage device (112).

A23. The rotary electric engine (100) of paragraph A22, wherein the power conditioner (118) includes one or more of:

(i) an electric speed controller;

(ii) an AC/DC converter; and (iii) a DC/AC inverter.

A24. The rotary electric engine (100) of any of paragraphs A22-A23, wherein one or more of:

(i) the unconditioned electric power input (120) includes, or is, a DC unconditioned electric power input (120);

(ii) the conditioned electric power input (120) includes, or is, an AC conditioned electric power input (120);

(iii) the unconditioned electric power output (122) includes, or is, an AC unconditioned electric power output (122); and (iv) the conditioned electric power output (122) includes, or is, a DC conditioned electric power output (122).

A25. The rotary electric engine (100) of any of paragraphs A1-A24, wherein each fan blade (210) has a blade longitudinal axis (212) that extends from the blade root (224) to the blade tip (226), and wherein each rotor magnet (182) of the plurality of rotor magnets (182) has a magnet shape (184), as viewed along the blade longitudinal axis (212) of the corresponding fan blade (210) of the plurality of fan blades (210), that has at least one magnet shape edge (186) that is at least partially curved.

A26. The rotary electric engine (100) of paragraph A25, wherein at least one magnet shape edge (186) of the magnet shape (184) has a concave segment and a convex segment that are separated by a magnet shape point of inflection (188).

A27. The rotary electric engine (100) of any of paragraphs A25-A26, wherein the magnet shape (184) is configured to match a shape, as viewed along the blade longitudinal axis (212), of the blade tip (226) of the corresponding fan blade (210).

A28. The rotary electric engine (100) of any of paragraphs A1-A27, wherein each field coil (160) of the plurality of field coils (160) has a coil shape (190), as viewed along a/the blade longitudinal axis (212) of a corresponding fan blade (210) of the plurality of fan blades (210) when the field coil (160) is aligned with the corresponding fan blade (210), that at least substantially matches a/the magnet shape (184) of each rotor magnet (182).

A29. The rotary electric engine (100) of paragraph A28, wherein the coil shape (190) has at least one coil shape edge (192) that is at least partially curved.

A30. The rotary electric engine (100) of any of paragraphs A28-A29, wherein at least one coil shape edge (192) of the coil shape has a concave segment and a convex segment that are separated by a coil shape point of inflection 194.

A31. The rotary electric engine (100) of any of paragraphs A1-A30, wherein each fan blade (210) of the plurality of fan blades (210) is configured to rotate relative to the central hub (204) and about a respective blade pitch axis (214) of the fan blade (210).

A32. The rotary electric engine (100) of paragraph A31, wherein the blade pitch axis (214) is at least substantially parallel to a/the blade longitudinal axis (212).

A33. The rotary electric engine (100) of any of paragraphs A31-A32, wherein each fan blade (210) of the plurality of fan blades (210) has:

a blade leading edge (216);

a blade trailing edge (218) opposite the blade leading edge (216);

a blade chord line (220) that extends between the blade leading edge (216) and the blade trailing edge (218) and in a direction perpendicular to a/the blade longitudinal axis (212); and a blade pitch angle (222), as measured between the blade chord line (220) and the fan plane (202); and wherein each fan blade (210) of the plurality of fan blades (210) is configured to rotate about the blade pitch axis (214) to adjust the blade pitch angle (222).

A34. The rotary electric engine (100) of paragraph A33, wherein the blade chord line (220) extends through a portion of the fan blade (210) that is proximate the blade tip (226).

A35. The rotary electric engine (100) of paragraph A33, wherein the blade chord line (220) extends through a portion of the fan blade (210) that is proximate the blade root (224).

A36. The rotary electric engine (100) of any of paragraphs A33-A35, wherein the fan (200) is configured such that the respective blade pitch angles (222) of the plurality of fan blades (210) are maintained at least substantially equal to one another.

A37. The rotary electric engine (100) of any of paragraphs A33-A36, wherein each fan blade (210) of the plurality of fan blades (210) is configured to rotate about the respective blade pitch axis (214) at least partially automatically responsive to a/the fan rotational velocity of the fan (200).

A38. The rotary electric engine (100) of any of paragraphs A33-A37, further comprising a fan blade pitch controller (230) configured to actively and dynamically rotate each fan blade (210) of the plurality of fan blades (210) about the respective blade pitch axis (214) to control the respective blade pitch angle (222) of each fan blade (210).

A39. The rotary electric engine (100) of any of paragraphs A1-A38, wherein the stator (150) is configured to selectively and dynamically rotate each field coil (160) of the plurality of field coils (160) relative to the nacelle (130).

A40. The rotary electric engine (100) of paragraph A39, wherein each field coil (160) of the plurality of field coils (160) has a coil first end (166), a coil second end (168) opposite the coil first end (166), and a coil orientation axis (170) that extends between the coil first end (166) and the coil second end (168); wherein each field coil (160) has a coil pitch angle (174), as measured between the coil orientation axis (170) and the fan plane (202); and wherein each field coil (160) of the plurality of field coils (160) is configured to rotate relative to the nacelle (130) about a respective coil pitch axis (172) that extends perpendicular to the coil orientation axis (170) to adjust the coil pitch angle (174).

A41. The rotary electric engine (100) of paragraph A40, wherein the coil pitch axis (172) extends at least substantially parallel to the fan plane (202).

A42. The rotary electric engine (100) of any of paragraphs A40-A41, wherein the stator (150) is configured such that the respective coil pitch angles (174) of the plurality of field coils (160) are maintained at least substantially equal to one another.

A43. The rotary electric engine (100) of any of paragraphs A40-A42, wherein the stator (150) is configured such that the coil pitch angle (174) of each field coil (160) remains at least substantially equal to a/the blade pitch angle (222) of each fan blade (210) as one or both of the coil pitch angle (174) and the blade pitch angle (222) is adjusted.

A44. The rotary electric engine (100) of any of paragraphs A39-A43, wherein the stator (150) is configured to selectively and dynamically rotate each field coil (160) of the plurality of field coils (160) to maintain each field coil (160), optionally a/the coil core (164) of each coil core, in an orientation that is at least substantially aligned with each rotor magnet (182) of the plurality of rotor magnets (182) when each rotor magnet (182) is proximate to the field coil (160) and as each fan blade (210) of the plurality of fan blades (210) rotates about a/the respective blade pitch axis (214).

A45. The rotary electric engine (100) of any of paragraphs A39-A44, further comprising a coil pitch controller (158) configured to selectively and actively rotate each field coil (160) of the plurality of field coils (160) about a/the respective coil pitch axis (172) to control a/the respective coil pitch angle (174) of each field coil (160).

A46. The rotary electric engine (100) of any of paragraphs A39-A45, wherein the stator (150) further includes a first support ring (152) and a second support ring (154); wherein each field coil (160) of the plurality of field coils (160) is pivotally coupled to each of the first support ring (152) and the second support ring (154); and wherein the stator (150) is configured to selectively and dynamically rotate one or both of the first support ring (152) and the second support ring (154) about the electric engine central axis (102) and relative to the nacelle (130) to selectively and dynamically rotate each field coil (160) of the plurality of field coils (160) about a/the respective coil pitch axis (172).

A47. The rotary electric engine (100) of paragraph A46, wherein each of the first support ring (152) and the second support ring (154) is maintained at least substantially parallel to the fan plane (202).

A48. The rotary electric engine (100) of any of paragraphs A46-A47, wherein each field coil (160) of the plurality of field coils (160) is pivotally coupled to the first support ring (152) at a location that is proximate a/the respective coil first end (166) of the field coil (160) relative to a/the respective coil second end (168) of the field coil (160), and wherein each field coil (160) of the plurality of field coils (160) is pivotally coupled to the second support ring (154) at a location that is proximate the respective coil second end (168) of the field coil (160) relative to the respective coil first end (166) of the field coil (160).

A49. The rotary electric engine (100) of any of paragraphs A46-A48, wherein the stator (150) further includes a ring actuator (156) configured to rotate one or both of the first support ring (152) and the second support ring (154) about the electric engine central axis (102) and relative to the nacelle (130).

A50. The rotary electric engine (100) of paragraph A49, wherein a/the coil pitch controller (158) is configured to control the ring actuator (156) to selectively and dynamically rotate one or both of the first support ring (152) and the second support ring (154) about the electric engine central axis (102) to selectively and dynamically rotate each field coil (160) of the plurality of field coils (160) about the respective coil pitch axis (172).

A51. The rotary electric engine (100) of any of paragraphs A1-A50, further comprising a nacelle heating structure (136) for heating at least a portion of the nacelle (130) during operative use of the rotary electric engine (100).

A52. The rotary electric engine (100) of paragraph A51, wherein the nacelle heating structure (136) is configured to inhibit a formation of ice upon the nacelle (130) during operative use of the rotary electric engine (100).

A53. The rotary electric engine (100) of any of paragraphs A51-A52, wherein the nacelle heating structure (136) includes a thermal coupling structure (138) configured to enhance thermal communication between at least a portion of the stator (150) and at least a portion of the nacelle (130) to convey heat energy from the stator (150) to the nacelle (130).

A54. The rotary electric engine (100) of paragraph A53, wherein the nacelle (130) includes a lip skin (134) that at least partially defines an air intake (132) of the rotary electric engine (100), and wherein the thermal coupling structure (138) is configured to convey heat energy from the stator (150) to the lip skin (134).

A55. The rotary electric engine (100) of any of paragraphs A53-A54, wherein the thermal coupling structure (138) is in thermal communication with:
(i) the coil wire (176) of each field coil (160) of the plurality of field coils (160); and
(ii) at least a portion of the nacelle (130), optionally with a/the lip skin (134) of the nacelle (130).

A56. The rotary electric engine (100) of any of paragraphs A53-A55, wherein the thermal coupling structure (138) includes one or more of a conduit, a metal conduit, and a heat pipe.

A57. The rotary electric engine (100) of any of paragraphs A51-A56, wherein the nacelle heating structure (136) includes a heating element (140) that is operatively coupled to the nacelle (130) and in thermal contact the nacelle (130), wherein the nacelle heating structure (136) is configured to heat at least a portion of the nacelle (130), optionally the lip skin (134) of the nacelle (130).

A58. The rotary electric engine (100) of paragraph A57, wherein the nacelle heating structure (136) includes one or more of an electric heater and a grid of resistors.

B1. An aircraft (10), comprising:
a fuselage (30);
one or more wings (40) operatively coupled to the fuselage (30);
one or more instances of the rotary electric engine (100) of any of paragraphs A1-A58; and
one or more engine mount regions (20), each engine mount region (20) operatively supporting a respective instance of the rotary electric engine (100) therein;
wherein each wing (40) includes one or more of the engine mount regions (20).

B2. The aircraft (10) of paragraph B1, wherein the aircraft (10) is an unmanned aerial vehicle.

B3. The aircraft (10) of any of paragraphs B1-B2, wherein each rotary electric engine (100) supported within each engine mount region (20) of each wing (40) is a wing rotary electric engine (42).

B4. The aircraft (10) of any of paragraphs B1-B3, wherein each rotary electric engine (100) is configured to selectively transition between a plurality of configurations defined between and including two or more of:
(i) a vertical lift configuration, in which the respective electric engine thrust direction (106) of the rotary electric engine (100) is directed at least substantially vertically upward relative to the aircraft (10);

(ii) a forward flight configuration, in which the respective electric engine thrust direction (106) of the rotary electric engine (100) is directed at least substantially in a forward direction (14) of the aircraft (10);

(iii) a reverse flight configuration, in which the respective electric engine thrust direction (106) of the rotary electric engine (100) is directed at least substantially in an aft direction (16) of the aircraft (10); and (iv) a lift counterforce configuration, in which the respective electric engine thrust direction (106) of the rotary electric engine (100) is directed at least substantially vertically downward relative to the aircraft (10).

B5. The aircraft (10) of any of paragraphs B1-B4, wherein the respective nacelle (130) of each rotary electric engine (100) includes a fairing (142) that at least substantially conforms to the engine mount region (20) when the rotary electric engine (100) is in one or both of a/the forward flight configuration and a/the reverse flight configuration.

B6. The aircraft (10) of paragraph B5, wherein the fairing (142) includes a fairing surface (144) that extends at least substantially perpendicular to the fan plane (202).

B7. The aircraft (10) of paragraph B6, wherein, when the rotary electric engine (100) is in one or either of the forward flight configuration and the reverse flight configuration, the fairing surface (144) is one or more of:

(i) at least substantially aligned with the respective engine mount region (20); and (ii) at least substantially continuous with the respective engine mount region (20).

B8. The aircraft (10) of any of paragraphs B1-B7, wherein each rotary electric engine (100) is configured to rotate with respect to the respective engine mount region (20) about a respective electric engine pivot axis (104).

B9. The aircraft (10) of paragraph B8, wherein each engine mount region (20) includes an electric engine pivotal support (22) that at least partially supports the respective rotary electric engine (100) within the engine mount region (20), and wherein the electric engine pivotal support (22) operates to selectively pivot the rotary electric engine (100) with respect to the engine mount region (20) about the respective electric engine pivot axis (104).

B10. The aircraft (10) of paragraph B9, wherein each electric engine pivotal support (22) includes a pivot shaft (24) that is operatively coupled to each of the respective rotary electric engine (100) and the respective engine mount region (20) and that extends at least partially along the electric engine pivot axis (104).

B11. The aircraft (10) of any of paragraphs 139-1310, wherein each electric engine pivotal support (22) includes a torque tube (26) configured to impart a torque on the respective rotary electric engine (100) to rotate the respective rotary electric engine (100) relative to the respective engine mount region (20) about the respective electric engine pivot axis (104).

B12. The aircraft (10) of any of paragraphs B8-B11, when dependent from paragraph B4, wherein each rotary electric engine (100) is configured to rotate about the respective electric engine pivot axis (104) to selectively transition between the plurality of configurations defined between and including the two or more of the vertical lift configuration, the forward flight configuration, the reverse flight configuration, and the lift counterforce configuration.

B13. The aircraft (10) of any of paragraphs B1-B12, wherein the aircraft (10) includes two engine mount regions (20) supporting a/the respective wing rotary electric engines (42) and positioned in the one or more wings (40) and on opposite sides of the fuselage (30).

B14. The aircraft (10) of any of paragraphs B3-B13, wherein each wing rotary electric engine (42) is at least substantially aligned with a center of gravity (12) of the aircraft (10) in a forward-aft direction of the aircraft (10).

B15. The aircraft (10) of any of paragraphs B1-B14, further comprising one or more horizontal stabilizers (50) positioned aft of the one or more wings (40), wherein each horizontal stabilizer (50) includes at least one engine mount region (20), and wherein each rotary electric engine (100) supported within each engine mount region (20) of each horizontal stabilizer (50) is a horizontal stabilizer rotary electric engine (52).

B16. The aircraft (10) of any of paragraphs B1-B15, further comprising one or more canards (70) positioned forward of the one or more wings (40), wherein each canard (70) includes at least one engine mount region (20), and wherein each rotary electric engine (100) supported within each engine mount region (20) of each canard (70) is a canard rotary electric engine (72).

C1. A method (400) of operating the aircraft (10) of any of paragraphs B1-B16, comprising:

generating (410) an upward thrust with one or more of the rotary electric engines (100) in a/the vertical lift configuration to vertically lift the aircraft (10) from a ground surface;

transitioning (430) one or more of the rotary electric engines (100) from the vertical lift configuration to a/the forward flight configuration; and generating (440) a forward thrust with one or more of the rotary electric engines (100) in the forward flight configuration to propel the aircraft (10) in a/the forward direction (14).

C2. The method (400) of paragraph C1, wherein the generating (410) the upward thrust is performed at least partially with one or more of a/the wing rotary electric engines (42) in the vertical lift configuration.

C3. The method (400) of any of paragraphs C1-C2, wherein the generating (410) the upward thrust is performed at least partially with one or more of a/the horizontal stabilizer rotary electric engines (52) in the vertical lift configuration.

C4. The method (400) of any of paragraphs C1-C3, wherein the generating (410) the upward thrust is performed at least partially with one or more of a/the canard rotary electric engines (72) in the vertical lift configuration.

C5. The method (400) of any of paragraphs C1-C4, further comprising, at least partially concurrently with the generating (410) the upward thrust, generating (420) a downward thrust with one or more of the rotary electric engines (100).

C6. The method (400) of paragraph C5, wherein the generating (420) the downward thrust is performed at least partially with one or more of the horizontal stabilizer rotary electric engines (52) in the lift counterforce configuration.

C7. The method (400) of any of paragraphs C5-C6, wherein the generating (420) the downward thrust is performed at least partially with one or more of the canard rotary electric engines (72) in the lift counterforce configuration.

C8. The method (400) of any of paragraphs C1-C7, wherein the transitioning (430) the one or more of the rotary electric engines (100) from the vertical lift configuration to the forward flight configuration includes transitioning one or more of the wing rotary electric engines (42) from the vertical lift configuration to the forward flight configuration.

D1. A hybrid turbine engine (300), comprising:
 a gas turbine engine (310) that includes a turbine (312); and
 the rotary electric engine (100) of any of paragraphs A1-A58;
 wherein the rotary electric engine (100) is one or both of mechanically coupled to the gas turbine engine (310) and electrically coupled to the gas turbine engine (310).

D2. The hybrid turbine engine (300) of paragraph D1, wherein the gas turbine engine (310) further includes a turbine rotary shaft (314); wherein the turbine (312) is operatively coupled to the turbine rotary shaft (314); wherein the hybrid turbine engine (300) further includes:
 an electric engine rotary shaft (108) that is operatively coupled to the fan (200); and
 a clutch (330) including a clutch input (334), which is operatively coupled to the turbine rotary shaft (314), and a clutch output (336), which is operatively coupled to the electric engine rotary shaft (108); and
 wherein the clutch (330) is configured to be selectively transitioned between:
  (i) an engaged state in which the clutch input (334) is rotationally coupled to the clutch output (336); and
  (ii) a disengaged state in which the clutch input (334) is rotationally decoupled from the clutch output (336).

D3. The hybrid turbine engine (300) of any of paragraphs D1-D2, wherein the gas turbine engine (310) further includes one or both of:
 (i) a combustion chamber (316) that optionally is upstream from the turbine (312); and
 (ii) a compressor (318) that optionally is upstream from the combustion chamber (316), optionally is operatively coupled to a/the turbine rotary shaft (314), and optionally is configured to rotate with the turbine rotary shaft (314).

D4. The hybrid turbine engine (300) of any of paragraphs D1-D3, wherein the gas turbine engine (310) includes a/the electric generator (114).

D5. The hybrid turbine engine (300) of any of paragraphs D2-D4, wherein the clutch input (334) is directly operatively coupled to the turbine rotary shaft (314).

D6. The hybrid turbine engine (300) of any of paragraphs D2-D5, wherein the clutch output (336) is directly operatively coupled to the electric engine rotary shaft (108).

D7. The hybrid turbine engine (300) of any of paragraphs D2-D6, wherein the clutch (330) includes one or more of an overrunning clutch, a one-way clutch, a one-way tapered clutch, a tooth clutch, and a synchronized clutch.

D8. The hybrid turbine engine (300) of any of paragraphs D2-D7, wherein the clutch (330) includes a synchronization structure (340) configured to synchronize the clutch input (334) and the clutch output (336) prior to permitting the clutch (330) to transition from the disengaged state to the engaged state.

D9. The hybrid turbine engine (300) of paragraph D8, wherein the synchronization structure (340) includes a speed controller (342) configured to control a/the fan rotational velocity of the fan (200) to synchronize the clutch output (336) to the clutch input (334).

D10. The hybrid turbine engine (300) of any of paragraphs D2-D9, wherein the clutch (330) is an automatically actuated clutch.

D11. The hybrid turbine engine (300) of paragraph D10, wherein the clutch (330) is configured to automatically rotationally couple the clutch input (334) to the clutch output (336) when a clutch input rotational velocity of the clutch input (334) is greater than a clutch output rotational velocity of the clutch output (336).

D12. The hybrid turbine engine (300) of any of paragraphs D10-D11, wherein the clutch (330) is configured to automatically rotationally decouple the clutch input (334) from the clutch output (336) when a/the clutch input rotational velocity is less than a/the clutch output rotational velocity.

D13. The hybrid turbine engine (300) of any of paragraphs D2-D12, wherein the clutch (330) is a selectively actuated clutch.

D14. The hybrid turbine engine (300) of any of paragraphs D2-D13, wherein the clutch (330) includes an engagement structure (338) configured to selectively transition the clutch (330) between the engaged state and the disengaged state.

D15. The hybrid turbine engine (300) of paragraph D14, wherein the engagement structure (338) includes one or more of an electrically actuated engagement structure (338), a hydraulically actuated engagement structure (338), and an electromagnetically actuated engagement structure (338).

D16. The hybrid turbine engine (300) of any of paragraphs D14-D15, wherein the engagement structure (338) includes a collet (332) that is operatively coupled to one of the clutch input (334) and the clutch output (336), wherein the collet (332) is configured to selectively engage the other of the clutch input (334) and the clutch output (336) to transition the clutch (330) from the disengaged state to the engaged state.

D17. The hybrid turbine engine (300) of paragraph D16, wherein the collet (332) is an electromagnetically actuated collet.

D18. The hybrid turbine engine (300) of paragraph D17, wherein the collet (332) is biased toward the engaged state of the clutch (330), and wherein the collet (332) is configured such that providing an electric current to the collet (332) transitions the clutch (330) from the engaged state to the disengaged state.

D19. The hybrid turbine engine (300) of any of paragraphs D2-D18, wherein the electric engine rotary shaft (108) is one or more of:
 (i) parallel to the turbine rotary shaft (314); and
 (ii) axially aligned with the turbine rotary shaft (314).

D20. The hybrid turbine engine (300) of any of paragraphs D2-D19, wherein the electric engine rotary shaft (108) is axially offset from the turbine rotary shaft (314).

D21. The hybrid turbine engine (300) of any of paragraphs D2-D20, further comprising a gear box (350) that is configured to provide a predetermined rotational velocity ratio between the turbine rotary shaft (314) and the electric engine rotary shaft (108) when the clutch (330) is in the engaged state.

D22. The hybrid turbine engine (300) of paragraph D21, wherein the clutch input (334) is operatively coupled to the turbine rotary shaft (314) via the gear box (350).

D23. The hybrid turbine engine (300) of paragraph D22, wherein the gear box (350) includes a gear box input (352) that is operatively coupled to the turbine rotary shaft (314) and an output stub shaft (358) that is operatively coupled to the clutch input (334).

D24. The hybrid turbine engine (300) of any of paragraphs D21-D23, wherein the clutch output (336) is operatively coupled to the electric engine rotary shaft (108) via the gear box (350).

D25. The hybrid turbine engine (300) of paragraph D24, wherein the gear box (350) includes a gear box output (354) that is operatively coupled to the electric engine rotary shaft (108) and an input stub shaft (356) that is operatively coupled to the clutch output (336).

D26. An aircraft (10) comprising the hybrid turbine engine (300) of any of paragraphs D1-D25.

D27. The aircraft (10) of paragraph D26, wherein the nacelle (130) of the rotary electric engine (100) at least substantially encloses the gas turbine engine (310).

D28. The aircraft (10) of paragraph D26, wherein the rotary electric engine (100) is spaced apart from the gas turbine engine (310).

D29. The aircraft (10) of paragraph D28, further comprising a fuselage (30) and one or more wings (40); wherein the rotary electric engine (100) is supported by the one or more wings (40); and wherein the gas turbine engine (310) is supported by the fuselage (30).

E1. A method (500) of operating an aircraft (10) that includes the hybrid turbine engine (300) of any of paragraphs D1-D25, the method comprising:

generating (510) a gas turbine thrust with the gas turbine engine (310); and generating (520) an electric engine thrust with the rotary electric engine (100).

E2. The method (500) of paragraph E1, wherein the aircraft (10) is the aircraft (10) of any of paragraphs D26-D29.

E3. The method (500) of any of paragraphs E1-E2, wherein the generating (510) the gas turbine thrust and the generating (520) the electric engine thrust are performed at least partially concurrently.

E4. The method (500) of paragraph E3, wherein the generating (510) the gas turbine thrust and the generating (520) the electric engine thrust are performed concurrently with a/the clutch (330) in the engaged state.

E5. The method (500) of any of paragraphs E3-E4, wherein the generating (520) the electric engine thrust includes conveying (524) a torque from a/the turbine rotary shaft (314) to an/the electric engine rotary shaft (108) to rotate the fan (200) of the rotary electric engine (100).

E6. The method (500) of any of paragraphs E1-E5, wherein the generating (520) the electric engine thrust includes rotating (522) the fan (200) of the rotary electric engine (100) at least partially via a magnetic interaction between the stator (150) and the rotor (180).

E7. The method (500) of any of paragraphs E1-E6, wherein the generating (510) the gas turbine thrust and the generating (520) the electric engine thrust are performed concurrently with the clutch (330) in the disengaged state.

E8. The method (500) of any of paragraphs E1-E7, further comprising operating (530) the hybrid turbine engine (300) in a take-off mode in which the aircraft (10) accelerates and gains altitude.

E9. The method (500) of paragraph E8, wherein the operating (530) the hybrid turbine engine (300) in the take-off mode is at least partially performed with a/the clutch (330) in the engaged state.

E10. The method (500) of any of paragraphs E8-E9, wherein the operating (530) the hybrid turbine engine (300) in the take-off mode includes transitioning (532) the clutch (330) to the engaged state.

E11. The method (500) of any of paragraphs E1-E10, further comprising operating (540) the hybrid turbine engine (300) in a cruise mode in which one or both of a velocity of the aircraft (10) relative to ground and an altitude of the aircraft (10) above ground level is nonzero and remains at least substantially constant.

E12. The method (500) of paragraph E11, wherein the operating (540) the hybrid turbine engine (300) in the cruise mode is at least partially performed with the clutch (330) in the disengaged state.

E13. The method (500) of any of paragraphs E11-E12, wherein the operating (540) the hybrid turbine engine (300) in the cruise mode includes transitioning (542) the clutch (330) to the disengaged state.

E14. The method (500) of any of paragraphs E11-E13, wherein the operating (540) the hybrid turbine engine (300) in the cruise mode includes generating (544) an/the electric power output (122) with a/the electric generator (114).

E15. The method (500) of paragraph E14, when dependent from paragraph E6, wherein the rotating (522) the fan (200) of the rotary electric engine (100) includes utilizing the electric power output (122) to produce the magnetic interaction between the stator (150) and the rotor (180).

E16. The method (500) of any of paragraphs E14-E15, wherein the operating (540) the hybrid turbine engine (300) in the cruise mode includes storing (546) the electric power output (122) in an/the energy storage device (112).

E17. The method (500) of any of paragraphs E1-E16, further comprising operating (550) the hybrid turbine engine (300) in a landing mode in which the aircraft (10) decelerates and returns to ground.

E18. The method (500) of paragraph E17, wherein the operating (550) the hybrid turbine engine (300) in the landing mode is at least partially performed with the clutch (330) in the disengaged state.

E19. The method (500) of any of paragraphs E17-E18, wherein the operating (550) the hybrid turbine engine (300) in the landing mode includes transitioning (552) the clutch (330) to the disengaged state.

E20. The method (500) of any of paragraphs E18-E19, wherein the operating (550) the hybrid turbine engine (300) in the landing mode includes, with the clutch (330) in the disengaged state, one or both of:

(i) the generating (510) the gas turbine thrust with the gas turbine engine (310); and (ii) generating (554) a reverse thrust with the rotary electric engine (100).

E21. The method (500) of paragraph E20, wherein the generating (554) the reverse thrust includes rotating the fan (200) of the rotary electric engine (100) to produce a thrust that operates to decelerate the aircraft (10) relative to ground.

E22. The method (500) of any of paragraphs E17-E21, wherein the operating (550) the hybrid turbine engine (300) in the landing mode includes a/the generating (544) a/the electric power output (122) with a/the electric generator (114).

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

As used herein, the terms "selective" and "selectively," when modifying an action, movement, configuration, or other activity of one or more components or characteristics of an apparatus, mean that the specific action, movement, configuration, or other activity is a direct or indirect result of one or more dynamic processes, as described herein. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order, concurrently, and/or repeatedly. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

The various disclosed elements of apparatuses and systems and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein and such inventive subject matter may find utility in apparatuses, systems, and/or methods that are not expressly disclosed herein.

The invention claimed is:

1. A hybrid turbine engine, comprising:
   a gas turbine engine that includes a turbine; and
   a rotary electric engine that is one or both of mechanically coupled to the gas turbine engine and electrically coupled to the gas turbine engine;
   wherein the rotary electric engine comprises:
   a fan configured to rotate about a central axis of the rotary electric engine to generate a thrust along an electric engine thrust direction;
   a nacelle that at least substantially encompasses the fan;
   a stator operatively coupled to the nacelle; and
   a rotor operatively coupled to the fan;
   wherein the fan includes a central hub and a plurality of fan blades extending from the central hub;

wherein the plurality of fan blades extend at least substantially within a fan plane;
wherein each fan blade of the plurality of fan blades includes a blade root that is operatively coupled to the central hub and a blade tip opposite the blade root;
wherein the rotor includes a plurality of rotor magnets, and each of the rotor magnets is operatively coupled to a respective blade tip of a respective fan blade of the plurality of fan blades;
wherein the stator includes a plurality of field coils;
wherein the stator is configured such that, during operative use of the rotary electric engine, magnetic interaction between the plurality of field coils and the plurality of rotor magnets operates to rotate the fan about the central axis and to generate the thrust; and
further comprising a coil pitch controller;
wherein the stator is configured to selectively and dynamically rotate each field coil of the plurality of field coils relative to the nacelle via the coil pitch controller.

2. The hybrid turbine engine of claim 1, wherein the gas turbine engine further includes a turbine rotary shaft; wherein the turbine is operatively coupled to the turbine rotary shaft; wherein the hybrid turbine engine further includes:
an electric engine rotary shaft that is operatively coupled to the fan; and
a clutch including a clutch input, which is operatively coupled to the turbine rotary shaft, and a clutch output, which is operatively coupled to the electric engine rotary shaft; and
wherein the clutch is configured to be selectively transitioned between:
(i) an engaged state in which the clutch input is rotationally coupled to the clutch output; and
(ii) a disengaged state in which the clutch input is rotationally decoupled from the clutch output.

3. The hybrid turbine engine of claim 2, wherein the clutch includes an engagement structure configured to selectively transition the clutch between the engaged state and the disengaged state; wherein the engagement structure includes a collet that is operatively coupled to one of the clutch input and the clutch output; and wherein the collet is configured to selectively engage the other of the clutch input and the clutch output to transition the clutch from the disengaged state to the engaged state.

4. The hybrid turbine engine of claim 3, wherein the collet is an electromagnetically actuated collet; wherein the collet is biased toward the engaged state of the clutch; and wherein the collet is configured such that providing an electric current to the collet transitions the clutch from the engaged state to the disengaged state.

5. The hybrid turbine engine of claim 1, further comprising an electric generator that is configured to generate an electric power output.

6. The hybrid turbine engine of claim 5, wherein the electric generator includes the stator and the rotor.

7. The hybrid turbine engine of claim 5, wherein the gas turbine engine includes the electric generator.

8. The hybrid turbine engine of claim 7, wherein the electric generator is one or both of spaced apart from the nacelle and exterior to the nacelle.

9. An aircraft comprising the hybrid turbine engine of claim 1.

10. The aircraft of claim 9, wherein the nacelle at least substantially encloses the gas turbine engine.

11. The aircraft of claim 9, wherein the rotary electric engine is spaced apart from the gas turbine engine.

12. The aircraft of claim 11, further comprising a fuselage and one or more wings; wherein the rotary electric engine is supported by the one or more wings; and wherein the gas turbine engine is supported by the fuselage.

13. A method of operating the aircraft of claim 9, the method comprising:
generating a gas turbine thrust with the gas turbine engine; and
generating an electric engine thrust with the rotary electric engine.

14. The method of claim 13, wherein the generating the gas turbine thrust and the generating the electric engine thrust are performed at least partially concurrently.

15. The method of claim 14, wherein the gas turbine engine further includes a turbine rotary shaft; wherein the turbine is operatively coupled to the turbine rotary shaft; wherein the hybrid turbine engine further includes:
an electric engine rotary shaft that is operatively coupled to the fan; and
a clutch including a clutch input, which is operatively coupled to the turbine rotary shaft, and a clutch output, which is operatively coupled to the electric engine rotary shaft; and
wherein the clutch is configured to be selectively transitioned between:
(i) an engaged state in which the clutch input is rotationally coupled to the clutch output; and
(ii) a disengaged state in which the clutch input is rotationally decoupled from the clutch output; and
wherein the generating the electric engine thrust includes conveying a torque from the turbine rotary shaft to the electric engine rotary shaft to rotate the fan of the rotary electric engine.

16. The method of claim 15, further comprising operating the hybrid turbine engine in a take-off mode in which the aircraft accelerates and gains altitude; wherein the operating the hybrid turbine engine in the take-off mode is at least partially performed with the clutch in the engaged state.

17. The method of claim 15, further comprising operating the hybrid turbine engine in a cruise mode in which one or both of a velocity of the aircraft relative to ground and an altitude of the aircraft above ground level is nonzero and remains at least substantially constant; wherein the operating the hybrid turbine engine in the cruise mode is at least partially performed with the clutch in the disengaged state.

18. The method of claim 17, wherein the hybrid turbine engine further comprises an electric generator that is configured to generate an electric power output; and wherein the operating the hybrid turbine engine in the cruise mode includes generating the electric power output with the electric generator.

19. The method of claim 18, wherein the generating the electric engine thrust includes rotating the fan of the rotary electric engine at least partially via a magnetic interaction between the stator and the rotor; and wherein the rotating the fan of the rotary electric engine includes utilizing the electric power output to produce the magnetic interaction between the stator and the rotor.

20. The method of claim 15, further comprising operating the hybrid turbine engine in a landing mode in which the aircraft decelerates and returns to ground; wherein the operating the hybrid turbine engine in the landing mode includes, with the clutch in the disengaged state, generating a reverse thrust with the rotary electric engine; and wherein the generating the reverse thrust includes rotating the fan of the rotary electric engine to produce a thrust that operates to decelerate the aircraft relative to ground.

* * * * *